(12) United States Patent
Abe et al.

(10) Patent No.: US 7,525,939 B2
(45) Date of Patent: Apr. 28, 2009

(54) COMMUNICATION SYSTEM AND METHOD USING A RELAY NODE

(75) Inventors: Tetsushi Abe, Yokohama (JP); Hui Shi, Yokosuka (JP); Takahiro Asai, Yokosuka (JP); Hitoshi Yoshino, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 361 days.

(21) Appl. No.: 11/213,886

(22) Filed: Aug. 30, 2005

(65) Prior Publication Data

US 2006/0056338 A1 Mar. 16, 2006

(30) Foreign Application Priority Data

| Aug. 31, 2004 | (JP) | ............................ 2004-252879 |
| Oct. 20, 2004 | (JP) | ............................ 2004-306172 |
| Aug. 30, 2005 | (JP) | ............................ 2005-248823 |

(51) Int. Cl.
*H04Q 7/00* (2006.01)
(52) U.S. Cl. ...................... 370/328; 370/226; 370/274; 370/279; 370/315
(58) Field of Classification Search ......... 370/328–338, 370/226, 274, 279, 315
See application file for complete search history.

(56) References Cited

U.S. PATENT DOCUMENTS

| 6,058,105 A * | 5/2000 | Hochwald et al. ............ 370/310 |
| 2003/0236076 A1* | 12/2003 | Brunel ........................ 455/101 |
| 2006/0056338 A1 | 3/2006 | Abe et al. |

FOREIGN PATENT DOCUMENTS

EP 0 905 920 A2 3/1999

OTHER PUBLICATIONS

U.S. Appl. No. 11/565,958, filed Dec. 1, 2006, Shi et al.
Helmut Boelcskei, et al., "Capacity Scalling Laws in MIMO Relay Networks", Communication Technology Laboratory, XP-002366169, Apr. 18, 2004, pp. 1-26.
Ingmar Hammerstroem, et al., "Space-Time Processing for Cooperative Relay Networks", Vehicular Technology Conference, IEEE, XP-010700932, vol. 1, Oct. 6, 2003, pp. 404-408.
Patrick Herhold, et al., "On the Performance of Cooperative Amplify-and-Forward Relay Networks", ITG Conference on Source and Channel Coding (SCC), XP-002366170, Jan. 2004, 8 pages.

(Continued)

*Primary Examiner*—Vincent P Harper
*Assistant Examiner*—Khai M Nguyen
(74) *Attorney, Agent, or Firm*—Oblon, Spivak, McClelland, Maier & Neustadt, P.C.

(57) ABSTRACT

A communication node relays a transmission signal transmitted from a desired source node to a target destination node among multiple source nodes and multiple destination nodes. The communication node includes a first unitary matrix estimation unit that estimates a first unitary matrix by performing singular value decomposition involving one or more channel matrices between the relay node and the source nodes other than the desired source node; a second unitary matrix estimation unit that estimates a second unitary matrix by performing singular value decomposition involving one or more channel matrices between the relay node and the destination nodes other than the target destination node; and a transmission unit configured to transmit a relaying signal generated by multiplying a received signal by the first and second unitary matrices toward the target destination node.

13 Claims, 15 Drawing Sheets

OTHER PUBLICATIONS

U.S. Appl. No. 11/213,883, filed Aug. 30, 2005, Shi et al.
U.S. Appl. No. 11/213,886, filed Aug. 30, 2005, Abe et al.
Rohit U. Nabar, et al., "Capacity Scaling Laws in MIMO Wireless Networks", Allerton Conferencce on Communication, Control, and Computing, Oct. 2003, pp. 378-389.

* cited by examiner

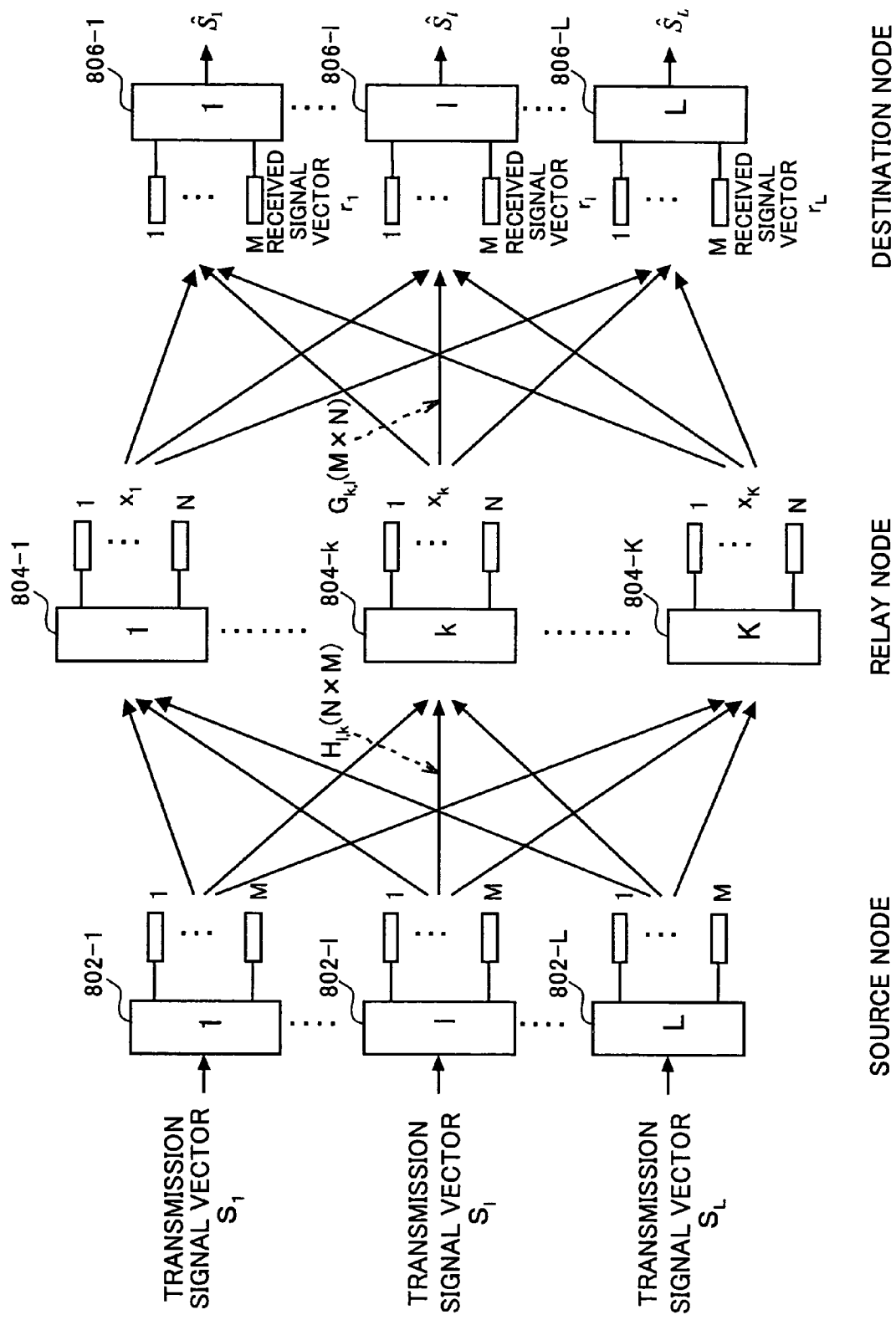

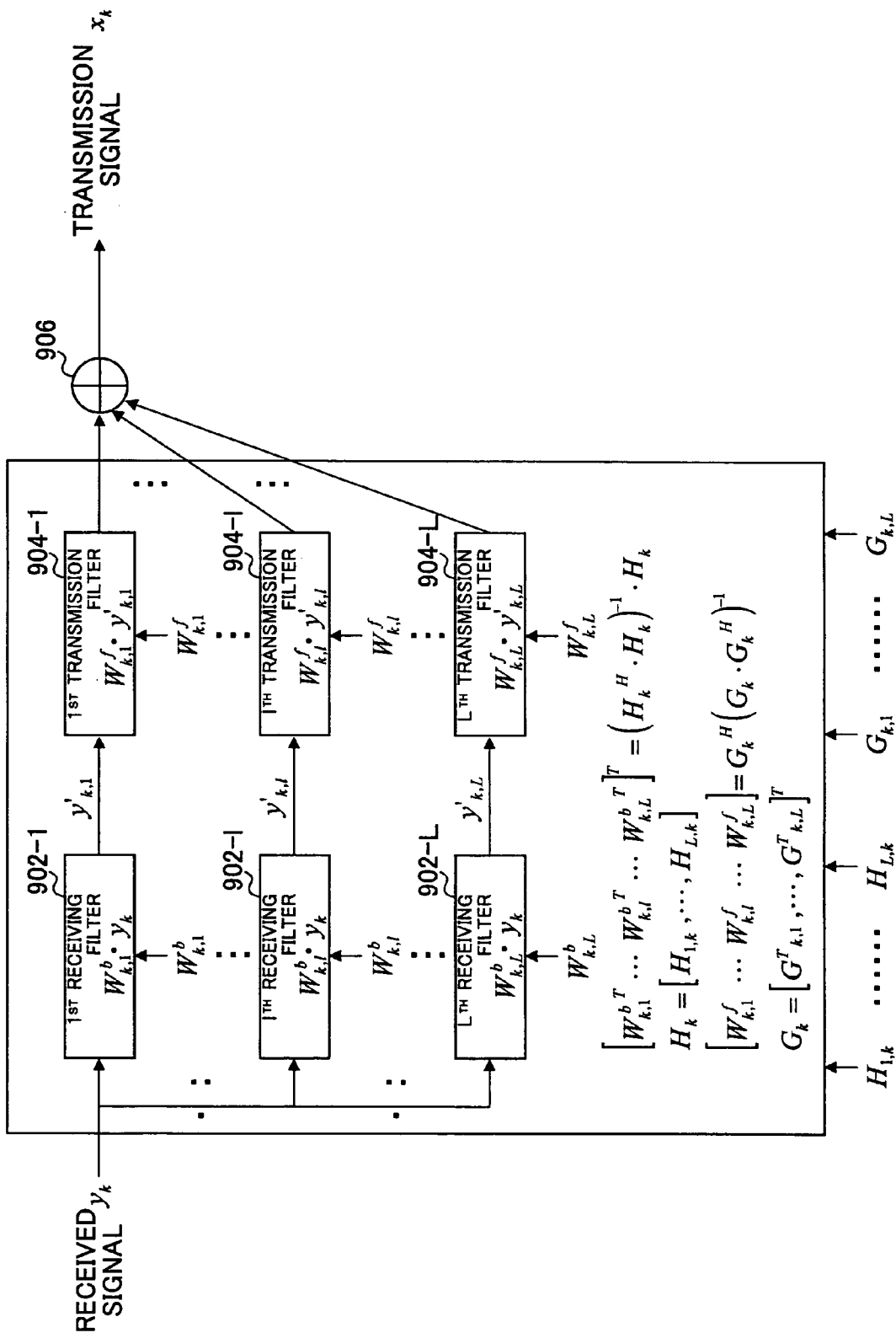

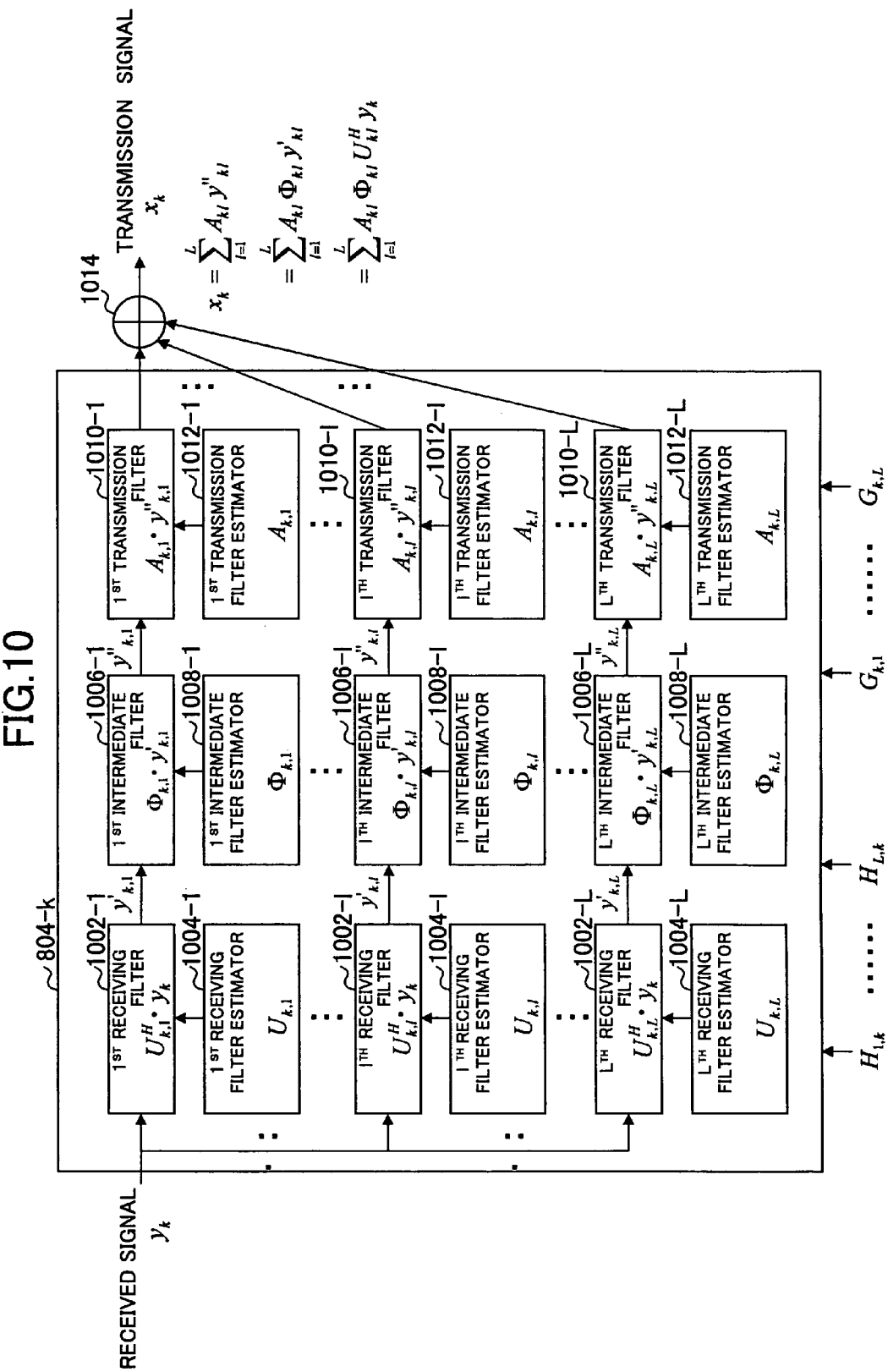

COMMUNICATION SYSTEM AND METHOD USING A RELAY NODE

BACKGROUND OF THE INVENITON

1. Field of the Invention

The present invention generally relates to wireless communications, and more particularly, to a communication node and a communication method using a multihop scheme and a multiple-input multiple-output (MIMO) scheme.

2. Description of the Related Art

In recent years and continuing, a system based on a combination of a multihop scheme and a MIMO (or multi-antenna) scheme, which system is referred to as a MIMO multihop system, is getting attention. In a multihop scheme, signals are transmitted from a source node to a destination node (or a target node) via one or more relay nodes located between the source and the destination. This system has advantages of expanded coverage by relaying signals, theoretically un-limited signal transmittable areas, and quick establishment of a wireless network. With a MIMO system, multiple transmission antennas and multiple receiving antennas are used to transmit and receive signals in order to increase communication capacity through efficient use of space.

Signal transmission is performed in a MIMO multihop system in the following steps. First, a signal S transmitted from a source node is received at a relay node. The received signal Y at the relay node is expressed as $$Y = HS + n \quad (1)$$

where H denotes a channel matrix between the source and the relay node, S denotes a transmission signal vector, and n denotes noise. Then, the transmission signal S is detected by a zero-forcing (ZF) method. This method is to detect the transmission signal S by calculating a pseudo inverse matrix $W_1 = (H^H H)^{-1} H^H$, and multiplying the received signal by the pseudo inverse matrix $W_1$, together with a normalization coefficient. This process is expressed $$W_1 Y = S + W_1 n. \quad (2)$$

The superscript H in the Pseudo inverse matrix $W_1$ denotes a conjugate transpose.

Norm for an arbitrary matrix A is defined by $$\|A\| = (Tr(E[AA^H]))^{1/2} \quad (3)$$

where symbol $\|\cdot\|$ represents norm, symbol $Tr(\cdot)$ represents the total sum of the diagonal elements of the matrix in the parenthesis, that is, a trace, and symbol $E[\cdot]$ represents averaging the quantities in the bracket. In particular, norm $\|V\|$ for vector quantity $V = (v_1, v_2, \ldots, v_M)^T$ is expressed as $$\|V\| = [|v_1|^2 + |v_2|^2 + \ldots + |v_M|^2]^{1/2} \quad (3)'$$

where superscript T represents transpose. The above-described pseudo inverse matrix corresponds to a Moore-Penrose inverse matrix. In general, the Moore-Penrose inverse matrix B is defined as a m×n matrix that establish BA=I for a n×m matrix A. In the illustrated example, $W_1 H = I$ holds with respect to matrix H.

Then, pseudo inverse matrix $W_2 = (G^H G)^{-1} G^H$ is calculated, where G denotes a channel matrix between a relay node and the destination node. Both sides of Equation (2) are multiplied by this pseudo inverse matrix $W_2$ and a normalization coefficient E. This relation is expressed as $$E(W_2 W_1) Y = E W_2 (S + W_1 n) \quad (4)$$

where $E = 1/(\|W_1\| \|W_2\|) * (P_s/(P_s + \sigma_n^2))^{1/2}$ holds, Ps denotes transmit power, and $\sigma^2$ is variance of noise.

The thus calculated signal is transmitted from a relay node to the destination node. The signal $Y_R$ received at the destination node is expressed as $$Y_R = G E W_2 W_1 Y + n_R \quad (5)$$

where $n_R$ denotes a noise component. Equation (5) can be rewritten as $$Y_R = E(S + W_1 n) + n_R \quad (6)$$

based on the definitions of $W_1$ and $W_2$.

In this manner, the transmission signal S can be acquired promptly at the destination node. Such a MIMO multihop system is described in, for example, Rohit U. Nabar, et al., "Capacity Scaling Laws in MIMO Wireless networks", Allerton Conference on Communication, Control, and Computing, Monticello, Ill., pp. 378-389, October 2003.

From Equation (6), it is understood that the received signal $Y_R$ contains a factor $1/(\|W_1\| \|W_2\|)$ with respect to the transmission signal S. Such factors $\|W_1\|$ and $\|W_2\|$ are indispensable for transmit power control performed at the relay node. However, since $W_1$ and $W_2$ are inverse matrices of channel matrices H and G, respectively, which are subjected to influence of noise amplitude, signal quality is inevitably degraded. In addition, Equation (6) contains the noise component "n", which is introduced during propagation from the source to the relay node in such a manner that greatly affects the received signal. Accordingly, as the number of hops increases, signal degradation due to the noise become conspicuous.

In addition, consideration has to be made of a wireless communication system in which signals are relayed simultaneously from multiple source nodes to associated destination nodes via relay nodes. In such a system, the signal received at the destination node contains not only influence of the desired source node, but also that of the other source nodes. There is concern in such a system that the noise is amplified at the relay node, and that the received signal quality at the destination node is particularly degraded.

SUMMARY OF THE INVENTION

The present invention was conceived to overcome the above-described problems, and it is an object of the invention to provide a communication system, a communication node, and a communication method that can prevent degradation of received signal quality at a destination node more efficiently, as compared to conventional techniques, in signal transmission from a source node to the destination.

In one aspect of the invention, a communication node for relaying a transmission signal transmitted from a desired source node to a target destination node among a plurality of source nodes and a plurality of destination nodes is provided. The communication node comprises:

(a) a first unitary matrix estimation unit configured to estimate a first unitary matrix by performing singular value decomposition involving one or more channel matrices between the relay node and said plurality of source nodes other than the desired source node;

(b) a second unitary matrix estimation unit configured to estimate a second unitary matrix by performing singular value decomposition involving one or more channel matrices between the relay node and said plurality of destination nodes other than the target destination node; and (c) a transmission unit configured to transmit a relaying signal generated by multiplying a received signal by the first and second unitary matrices toward the target destination node.

In a communication system using such a relay node, the destination node detects the transmission signal from the received relaying signal.

In another aspect of the invention, a communication node for relaying a transmission signal transmitted from a desired source node among multiple source nodes to a destination node is provided. The communication node includes:
(a) a matrix estimation unit configured to estimate a Moore-Penrose inverse matrix derived from a plurality of channel matrices between the relay node and multiple nodes;
(b) a first unitary matrix estimation unit configured to estimate a first unitary matrix by performing singular value decomposition involving one or more channel matrices between the relay node and said multiple source nodes other than the desired source node;
(c) a second unitary matrix estimation unit configured to estimate a second unitary matrix by performing singular value decomposition involving one or more channel matrices between the relay node and a plurality of destination nodes other than said destination node;
(d) a relaying signal generating unit configured to generate a relaying signal by multiplying a received signal by two of a weighting matrix defining the Moore-Penrose inverse matrix, the first unitary matrix, and the second unitary matrix; and
(e) a transmission unit configured to transmit the relaying signal to the destination node.

With either type of communication node, in signal transmission from the source node to the destination node using a multihop MIMO scheme, degradation of signal quality received at the destination node can be prevented.

BRIEF DESCRIPTION OF THE DRAWINGS

Other objects, features, and advantages of the invention become more apparent from the following detailed description when read in conjunction with the accompanying drawings, in which

FIG. 8 is a schematic diagram illustrating a communication system in which multiple nodes transmit and receive signals via relay nodes;

FIG. 9 is a functional block diagram of a conventional relay node;

FIG. 10 is a functional block diagram of a relay node according to the fourth embodiment of the invention;

DETAILED DESCRIPTION OF THE PREFERRED EMBODIMENT

Figure 1:
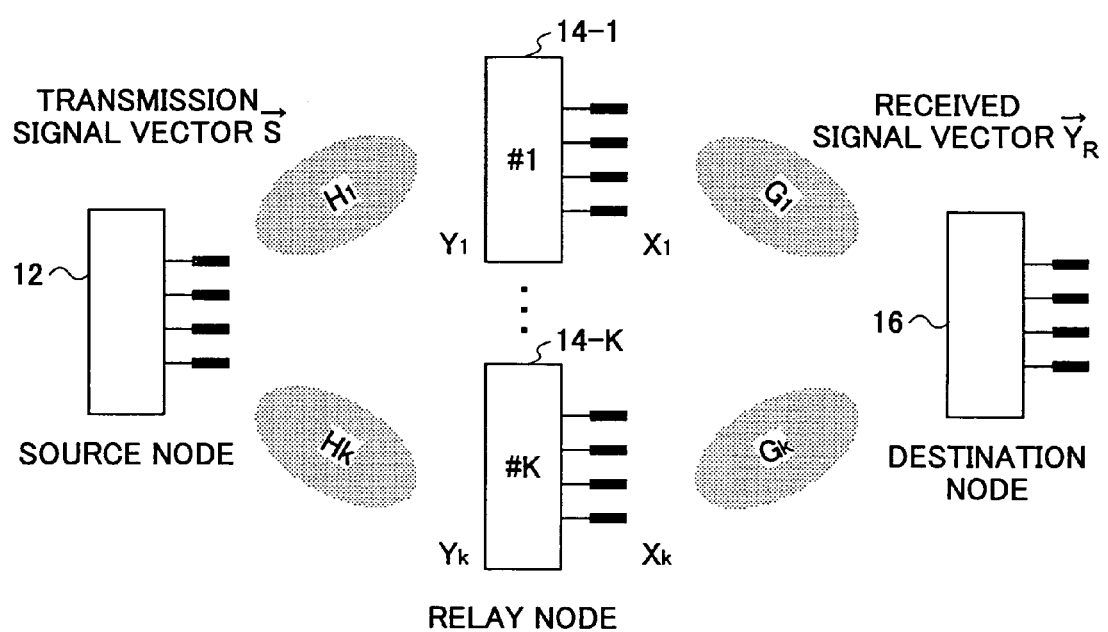
FIG. 1 is a schematic diagram illustrating a communication system employing a MIMO scheme and a multihop scheme.

The present invention is described in detail below in conjunction with the attached drawings. In the specification and claims, "unitary matrix" is not necessarily a normal matrix, and the number of lines and the number of columns may differ from each other. A "unitary matrix" is a matrix in which the respective lines (or the columns) are orthogonal to each other. Accordingly, as well as including a normal matrix that diagonalizes a square matrix A, the "unitary matrix" includes a N×M non-square matrix for diagonalizing a M×N non-square matrix B.

In a preferred embodiment, a first unitary matrix is determined by breaking down a first channel matrix between a source node and a relay node into a product containing a first triangular matrix, and a second unitary matrix is determined by breaking down a second channel matrix between a relay node and a destination node into a product containing a second triangular matrix. The matrix element in the i-th line and the j-th column is zero unless i+j satisfies a prescribes value.

A communication node used in an embodiment includes first means for breaking down a channel matrix H between a source node and a relay node into a product containing a first triangular matrix E, second means for breaking down a channel matrix G between the relay node and a destination node into a product containing a second triangular matrix P, transformation matrix generating means for generating a transformation matrix A based on the first and second triangular matrices, multiplication means for multiplying a received signal by a first unitary matrix, the transformation matrix, and a second unitary matrix to produce a relaying signal, and transmission means for transmitting the relaying signal to the destination node. The i-line, j-column element in the transformation matrix A is zero if i+j does not satisfy a prescribed value.

Because the relaying signal is produced using the unitary matrices and the transformation matrix, multihop communication can be realized while reducing signal loss and degradation of signal quality.

In an example, the transformation matrix is estimated based on a product of the first unitary matrix, a commutative matrix, and a conjugate transpose matrix of the second unitary matrix. With this arrangement, the destination node can combine relaying signals from multiple relay nodes in phase. Because the signal combining coefficient does not contain an imaginary component (phase component), there is no need to cancel some component during signal combination, and therefore, the relaying signals can be coherently combined in phase at the destination node.

In a preferred example, information about the rate and the power level of the transmission signal is fed back from the destination node to the source node using a feedback channel from the destination node via the relay node to the source node. Such information is acquired at the destination node based on channel estimation values.

In a preferred example, a method for relaying a transmission signal transmitted from a source node toward a destination node via a relay node is provided. In this method, a first channel matrix between the source node and the relay node is broken down into a product containing a first triangular matrix, while a second channel matrix between the relay node and the destination node is broken down into a product containing a second triangular matrix, at the relay node. Then, a transformation matrix is generated based on the first and second triangular matrices, where the i-th line, j-th column element of the transformation matrix is zero if i+j does not satisfy a prescribed value. Then, a signal received at the relay node is multiplied by a first unitary matrix, the transformation matrix, and a second unitary matrix. Then, the multiplied signal is transmitted from the relay node to the destination node.

Preferably, a third triangular matrix is generated at the destination node based on the first and second triangular matrices and the transformation matrix. Then the destination node detects the transmission signal from the received signal using the third triangular matrix.

In another example, a first channel matrix between the source node and the relay node is broken down into a product containing a first triangular matrix, while a second channel matrix between the relay node and the destination node is broken down into a product containing a second triangular matrix, at the relay node. Then, a received signal at the relay node is multiplied by a unitary matrix. Then, a transmission signal transmitted from the source node is detected from the received signal using the first triangular matrix. The detected transmission signal is then multiplied by the transformation matrix and the second unitary matrix. The resultant signal is transmitted from the relay node to the destination node.

In this case, the transmission signal is detected at the destination node from said resultant signal, using the second triangular matrix.

This method is advantageous in efficiently preventing noise accumulation at each relay node every hop. Because it is unnecessary for the destination node to perform unitary transformation, the workload for signal processing at the destination node can be reduced.

In still another example, a communication node relays a signal transmitted from a certain source node to a target destination node under the environment in which wireless communications are carried out among multiple source nodes and destination nodes. The communication node estimates a first unitary matrix based on one or more channel matrices between the relay node and one or more source nodes other than a desired source node, generates a relaying signal by multiplying a received signal by the first unitary matrix and a second unitary matrix, and transmits the relaying signal to the destination node. The first unitary matrix comprises a matrix acquired by performing singular value decomposition involving one or more channel matrices between the relay node and source nodes other than the desired source node.

By multiplying the received signal by the first unitary matrix, the transmission signal from the desired source node can be separated from the signal components from the other source nodes. In other words, interference from the other source nodes can be removed, but the interference from the desired source node cannot be removed. Instead, the noise component in the received signal can be maintained low, without being amplified, because the multiplication of the received signal by a unitary matrix does not cause the noise component to be amplified.

The second unitary matrix comprises a matrix acquired by performing singular value decomposition involving one or more channel matrices between the relay node and destination nodes other than the target destination node. Multiplication of the signal by the second unitary matrix allows the destination node to separate the transmission signal of the desired source node from other signal components from the other source nodes.

In still another example, the communication node further estimates a transformation matrix that is a product of a matrix, in which a matrix element at i-th line and j-th column is zero if the sum of the line number and the column number (i+j) is not a prescribed value, and one or more unitary matrices. In this case, the communication node transmits a relaying signal generated by multiplying the received signal by the first unitary matrix, the transformation matrix, and the second unitary matrix, to the destination node.

In yet another example, the communication node estimates a transformation matrix that is a product of a diagonal matrix and a unitary matrix. In this case, the communication node transmits a relaying signal generated by multiplying the received signal by the first unitary matrix, the transformation matrix and the second unitary matrix, to the destination node.

This arrangement has an advantage of reducing the operational workload for separating the transmission signal from the desired source at the destination node.

The communication node may further estimate a weighting matrix based on multiple channel matrices between the relay node and multiple source nodes including the desired source node. In this case, the communication node transmits a relaying signal generated by multiplying the received signal by the weighting matrix and a unitary matrix, to the target destination node. The unitary matrix comprises a matrix acquired by performing singular value decomposition involving one or more channel matrices between the relay node and destination nodes other than the target destination node.

In yet another example, the communication node generates a relaying signal by multiplying the received signal by two of the first unitary matrix, the second unitary matrix, and a weighting matrix consisting of a Moore-Penrose inverse matrix. The two matrices are selected based on the quality of the channel condition. This arrangement allows the relay node to select an appropriate relaying scheme in accordance with the channel condition, and can improve the received signal quality at the destination node.

Embodiment 1

FIG. 1 is a schematic diagram illustrating the overall structure of a communication system according to an embodiment of the invention. The communication system employs a multihop scheme and a multiple-input multiple-output (MIMO) scheme. The communication system includes a source node 12, a destination node 16, and K (K≧1) relay nodes 14-1 through 14-K. The k-th relay node is denoted as 14-$k$ (1≦k≦K). Communications between the source node 12 and the relay node 14-$k$ and communication between the relay node 14-$k$ and the destination node 16 are performed using a MIMO scheme. Signal transmission from the source node 12 to the destination node 16 is performed by a multihop scheme. In this embodiment, each of the K relay nodes can relay a signal from the source node 12 to the destination node 16 by one hop, for simplification purpose. However, the number of hops may be increased.

The source node 12 transmits mutually distinguishable signals from multiple antennas (M antennas, for example). Each of the M antennas transmits the associated signal independently under the MIMO scheme. The signals transmitted from M antennas define a transmission signal vector S, each signal being a vector component.

Each of K relay nodes 14 receives the signal from the source node 12, performs prescribed signal processing on the received signal to generate a relaying signal, and transmits the relaying signal to the destination node 16. The K relay nodes 14 have the same structure and functions, which structure and functions are described below.

The destination node 16 receives the relaying signals from the K relay nodes 14, and detects the contents of the transmission signal vector S transmitted from the source node 12.

Figure 2:
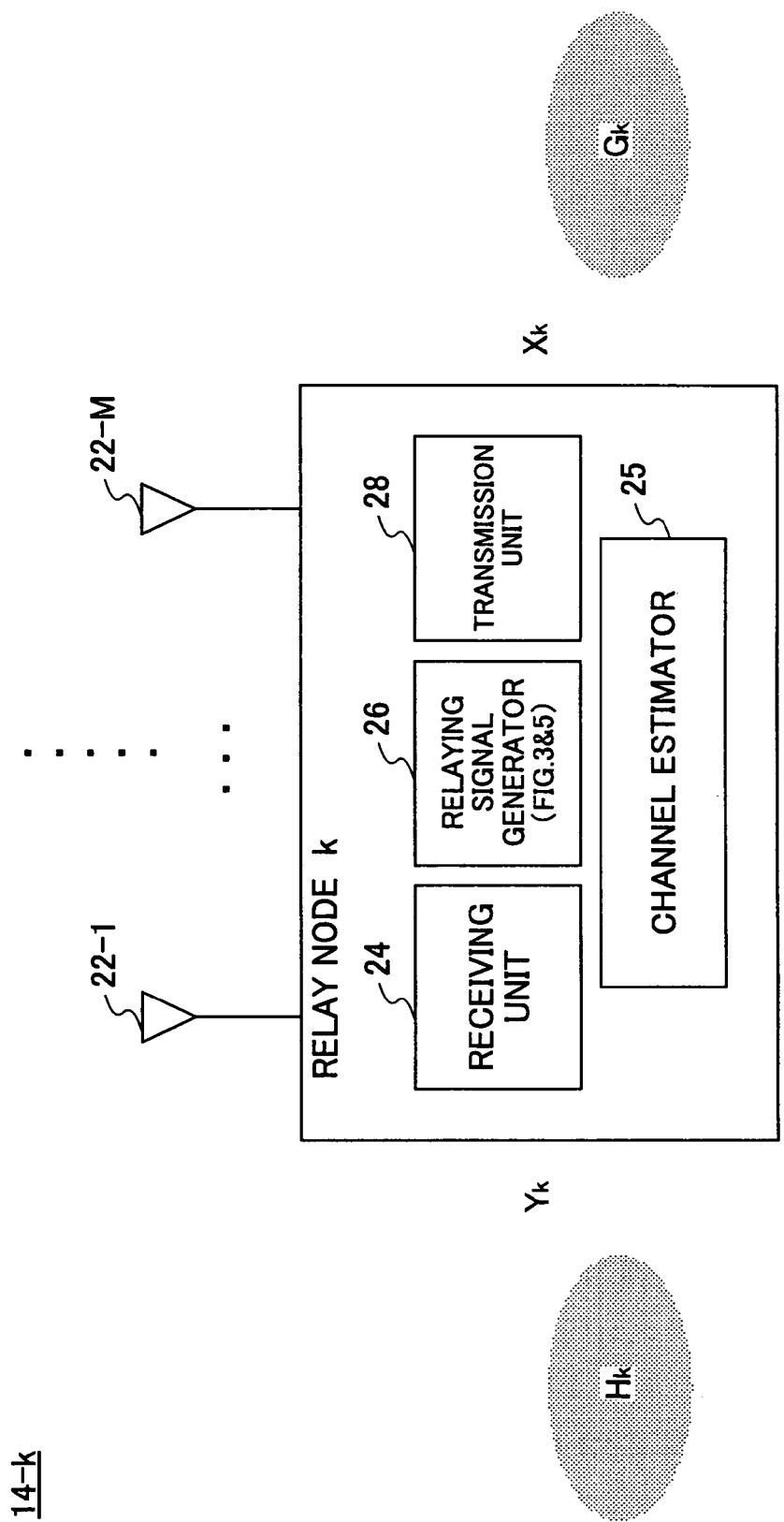
FIG. 2 is a schematic block diagram of a relay node.

FIG. 2 is a block diagram of the relay node 14-$k$. The relay node 14-$k$ has multiple antennas 22-1 through 22-M, a receiving unit 24, a channel estimator 25, a relaying signal generator 26, and a transmission unit 28. Since the source node 12 and the destination node 16 can also be relay nodes, this structure applies not only to the relay node 14, but also the source node 12 and the destination node 16.

In this embodiment, it is assumed for the purpose of simplification that each of the source node 12, the relay nodes 14-1 through 14-K, and the destination node 16 has M antennas for transmitting and receiving signal. However, these nodes may have different numbers of antennas, and in addition, different numbers of antennas may be used in transmission and receipt of signals.

The receiving unit 24 performs appropriate signal processing with respect to the signals $Y_k$ received at the M antennas 22-1 through 22-M. Such signal processing includes receiving front-end processes, such as frequency conversion and band limitation, and weighting for each antenna. The received signal $Y_k$ is expressed as a vector consisting of M components corresponding to the M antennas. The receiving unit 24 also analyzes the header of the received signal $Y_k$ to determine the destination node, to which node the signal is to be transmitted. If the signal cannot reach the destination node by one hop, the relay node 14-$k$ transmits the signal to another relay node.

The channel estimator 25 estimates a channel matrix $H_k$ between the source node 12 and the relay node 14-$k$. By receiving individual pilot channels transmitted from the source node 12, the matrix elements of the channel matrix $H_k$ can be derived. Similarly, the channel estimator 25 estimates a channel matrix $G_k$ between the relay node 14-$k$ and destination node 16. The channel estimator 25 also estimates the channel condition as necessary. The condition of the wireless channel can be estimated by measuring, for example, the SNR or the SIR, based on the received signal. The level of the channel condition can be used in the embodiments described below.

The relaying signal generator 26 generates a relaying signal $X_k$ based on the received signal $Y_k$ and the channel estimation result. The relaying signal $X_k$ is a vector consisting of M components corresponding to the M antennas. The relaying signal generator 26 will be described in more detail below.

The transmission unit 28 performs signal processing to transmit the relaying signal $X_k$ via the multiple antennas to the destination node 16. The signal processing includes frequency conversion, band limitation, power amplification, and weighting for each antenna.

Figure 3:
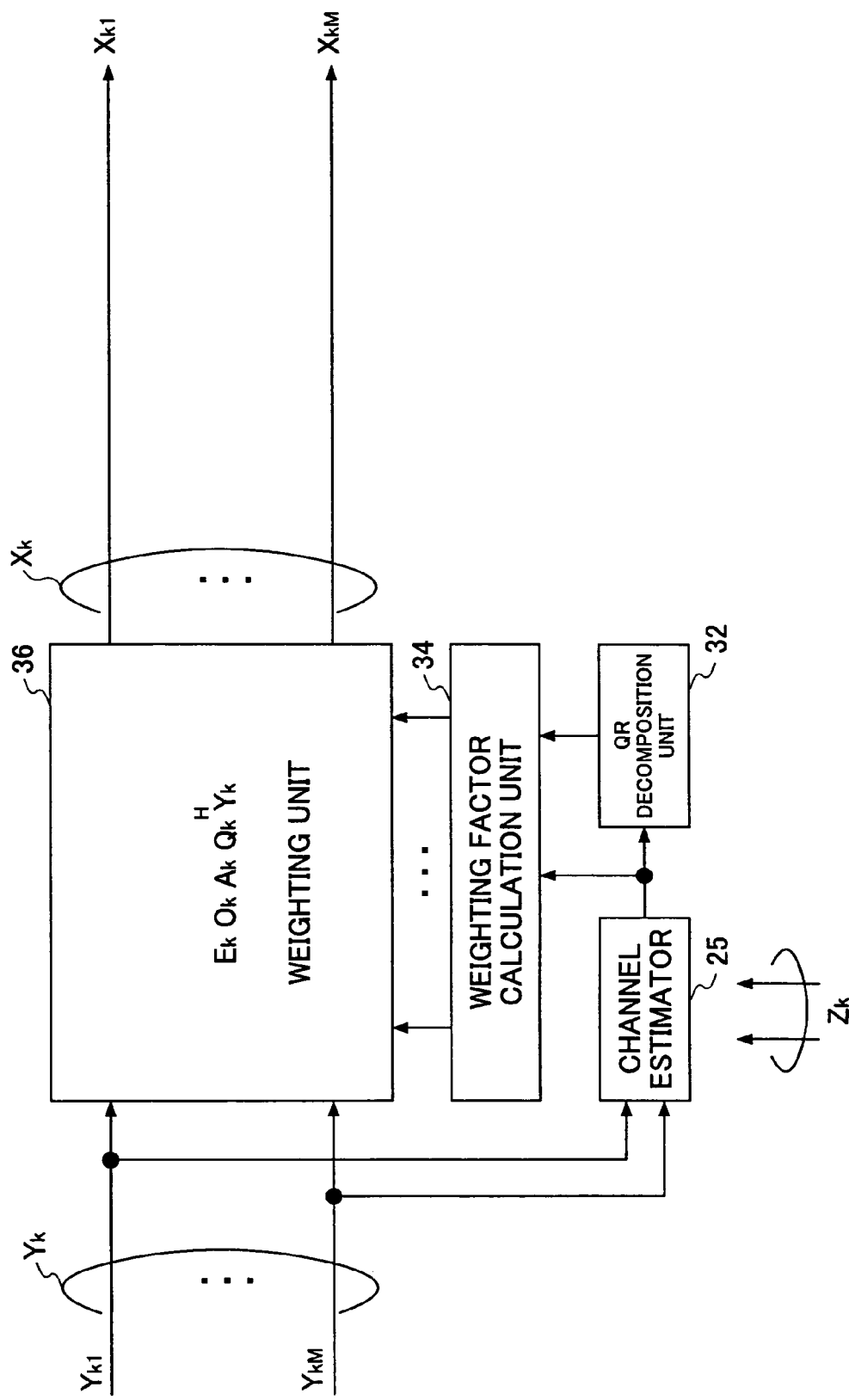
FIG. 3 is a functional block diagram of a relaying signal generator according to the first embodiment of the invention.

FIG. 3 is a functional block diagram of the relaying signal generator 26. The relaying signal generator 26 has a QR decomposition unit 32, a weighting factor calculation unit 34, and a weighting unit 36.

Upon receiving information about the channel matrices $H_k$ and $G_k$ from the channel estimator 25, the QR decomposition unit 32 breaks down the channel matrix $H_k$ into the form of a product of a unitary matrix $Q_k$ and a triangular matrix $R_k$. As a result, the unitary matrix $Q_k$ and the triangular matrix $R_k$ satisfying Equation (7) are determined.

$$H_k = Q_k R_k \tag{7}$$

It should be noted that the first through the (i−1)th line elements of the i-th line in the triangular matrix $R_k$ are zero ($2 \leq i \leq M$), as expressed by Equation (8).

$$R_k = \begin{pmatrix} r_{11} & \cdots & r_{1M} \\ & \ddots & \\ 0 & & r_{MM} \end{pmatrix} \tag{8}$$

The QR decomposition unit 32 also breaks down the channel matrix $G_k$ into the form of a product of a triangular matrix $P_k^H$ and a unitary matrix $O_k^H$ represented by Equation (9), where the superscript H indicates conjugate transpose.

$$G_k = P_k^H O_k^H \tag{9}$$

It should be noted that the first through the (i−1)th line elements of the i-th line in the triangular matrix $P_k$ are zero ($2 \leq i \leq M$), as expressed by Equation (10).

$$P_k = \begin{pmatrix} p_{11} & \cdots & p_{1M} \\ & \ddots & \\ 0 & & p_{MM} \end{pmatrix} \tag{10}$$

Since the matrix $P_k$ is a upper triangular matrix, the matrix $P_k^H$ is a lower triangular matrix.

Based on the channel matrices $H_k$ and $G_k$, as well as on the QR decomposition formulae, the weighting factor calculation unit 34 calculates weighting factors for the received signal $Y_k$. The details of the calculation of the weighting factors are described below in conjunction with the operation of the communication system.

The weighting unit 36 performs a prescribed matrix operation to convert the received signal $Y_k$ to a relaying signal $X_k$.

Figure 4:
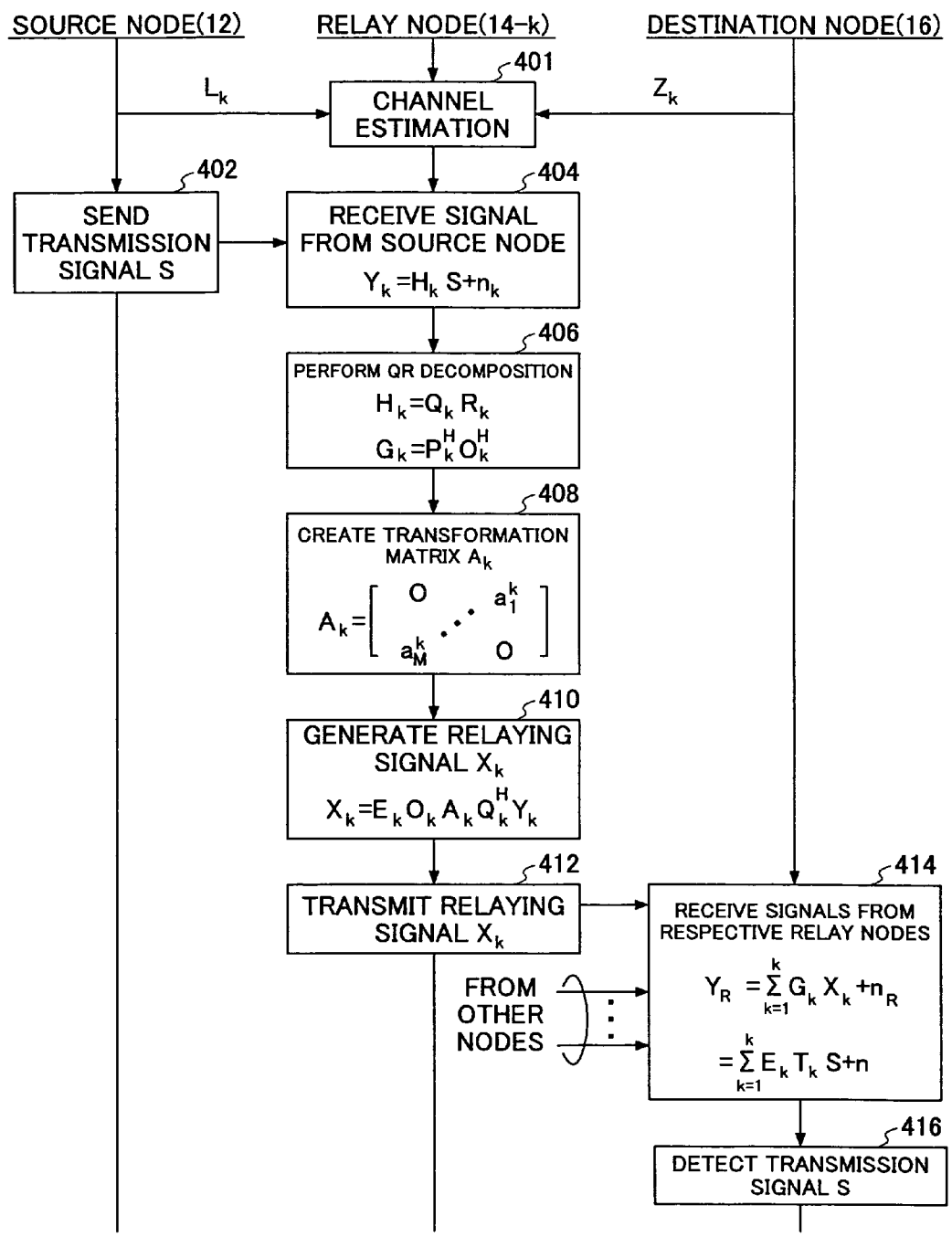
FIG. 4 is a flowchart illustrating operations of the communication system according to the first embodiment of the invention.

FIG. 4 is a flowchart showing the operations of the communication system according to the embodiment of the invention. In this communication system, the source node 12 transmits a transmission signal vector S consisting of a set of M signal components from the M antennas to surrounding relay nodes. The relay nodes located within a prescribed range from the source node 12 receive the signal S. This range may be called a 1-hop range. For convenience of explanation, it is assumed that K relay nodes receive the transmission signal S and perform similar signal processing to relay the signal to the destination node. Although only the k-th relay node ($1 \leq k \leq K$) is illustrated in FIG. 4, the other relay nodes perform similar operations.

First, the source node 12 and the destination node 16 transmit pilot signals $L_k$ and $Z_k$, respectively, which pilot signals are received at the relay node 14-$k$. In step 401, the relay node 14-$k$ performs channel estimation based on the pilot signals $L_k$ and $Z_k$ to estimate a channel matrix H between the source node 12 and the relay node 14-$k$ and a channel matrix G between the relay node 14-$k$ and the destination node 16.

In step 402, the source node 12 transmits a transmission signal represented as a signal vector S consisting of a set of M components from M antennas to surrounding relay nodes.

In step 404, the relay node 14-$k$ receives the signal from the source node 12. The received signal is expressed as $$Y_k = H_k S + n_k \tag{11}$$

where $H_k$ is a channel matrix between the source node 12 and the relay node k-th, as is described above, and $n_k$ denotes the noise component.

In step 406, the relay node 14-$k$ performs QR decomposition for the channel matrices $H_k$ and $G_k$ at the QR decomposition unit 32 (see FIG. 3). In this step, the channel matrix $H_k$ is broken down into the form of a product of a unitary matrix $Q_k$ and a triangular matrix $R_k$ ($H_k = Q_k R_k$), and the channel matrix $G_k$ is broken down into the form of a product of a triangular matrix $P_k^H$ and a unitary matrix $O_k^H$ ($G_k = P_k^H O_k^H$).

In step 408, a transformation matrix $A_k$ is calculated at the weighting factor calculation unit 34 (FIG. 3), based on the triangular matrices $P_k$ and $R_k$. The matrix element in the i-th line and j-th column of the transformation matrix $A_k$ is zero if i+j is not M+1 (i+j≠M+1). In this case, the transformation matrix $A_k$ is expressed by Equation (12).

$$A_k = \begin{bmatrix} 0 & & a_1^k \\ & \ddots & \\ a_M^k & & 0 \end{bmatrix} \quad (12)$$

In other words, the transformation matrix A is a matrix that becomes a diagonal matrix when the lines and the columns are arranged in reverse order (reversed diagonal matrix). If i+j equals M+1, the matrix element $(A_k)_{i, M-i+1} = a_i^k$ is expressed as $$a_i^k = \frac{(P_k^H \Pi R_k)_{i,M-i+1}^H}{\|(P_k^H \Pi R_k)_{i,M-i+1}^H\|} \quad (13)$$

where matrix $\Pi$ represents a commutative matrix, which is expressed by Equation (14).

$$\Pi = \begin{pmatrix} 0 & & 1 \\ & \ddots & \\ 1 & & 0 \end{pmatrix} \quad (14)$$

In step 410, a relaying signal $X_k$ is generated, which relaying signal is expressed by Equation (15)

$$X_k = E_k O_k A_k Q_k^H Y_k \quad (15)$$

The coefficient $E_k$ is a scalar quantity defined by $$E_k = \sqrt{\frac{PM}{P[tr\{(P_k^H A_k R_k)(P_k^H A_k R_k)^H\}] + MN\sigma^2}} \quad (16)$$

where P denotes the total transmit power at the source node 12, and $\sigma^2$ denotes a noise level.

In step 412, the relay signal $X_k$ is transmitted to the destination node 16.

In step 414, signals from all the relay nodes that relay the signal from the source node 12 are received at the destination node 16. The signal $Y_R$ received at the destination node 16 is expressed as $$Y_R = \sum_{k=1}^{K} G_k X_k + n_R \quad (17)$$

$$= \sum_{k=1}^{K} E_k T_k S + n$$

where $n_R$ and n represent noise components. From Equations (7), (9) and (11), the following relation holds.

$$Q_k^H Y_k = Q_k^H (H_k S + n_k)$$
$$= Q_k^H (Q_k R_k S + n_k)$$
$$= R_k S + Q_k^H n_k$$

In addition, from the above-described relation and Equations (9) and (16), the following relation holds.

$$G_k X_k = P_k^H O_k^H \cdot E_k O_k A_k Q_k^H Y_k$$
$$= E_k P_k^H A_k Q_k^H Y_k$$
$$= E_k P_k^H A_k R_k S + E_k P_k^H A_k Q_k^H n_k$$
$$= E_k T_k S + \text{(noise component)}$$

where $T_k = P_k^H A_k R_k$.

Matrix $T_k$ can be expressed as Equation (18), based on Equations (8), (10) and (16).

$$T_k = P_k^H A_k R_k \quad (18)$$

$$= \begin{bmatrix} 0 & & & a_1^k p_{22}^* r_{mm} \\ & & a_2^k p_{22}^* r_{m-1m-1} & \\ & \ddots & & \\ a_m^k p_{mm}^* r_{11} & & & \end{bmatrix}$$

$$= \begin{bmatrix} 0 & & & |p_{11}||r_{mm}| \\ & & |p_{22}||r_{m-1m-1}| & \\ & \ddots & & \\ |p_{mm}||r_{11}| & & & \end{bmatrix}$$

Taking Equation (13) into account, it is understood that the non-zero matrix element $a_i^k$ equals $p_{ii}(r_{M-i+1\ M-i+1})^*/|p_{ii}(r_{M-i+1\ M-i+1})^*|$, where the asterisk represents complex conjugate. Accordingly, $Y_k S$ becomes a matrix having the first through M-th elements expressed by Equation (19).

$$Y_k S = \begin{pmatrix} 0 & & t_{1,M}^{(k)} \\ & \ddots & \vdots \\ t_{M,1}^{(k)} & \cdots & t_{M,M}^{(k)} \end{pmatrix} \begin{pmatrix} S_1 \\ \vdots \\ S_M \end{pmatrix} \quad (19)$$

$$= \begin{pmatrix} |P_{1,1}||r_{M,M}|S_M \\ \vdots \\ |P_{M,M}||r_{1,1}|S_1 + \ldots + t_{M,M}^{(k)} S_M \end{pmatrix}$$

In step 416, transmission signal S is detected based on Equations (17) and (18). The signal detection is carried out using a successive interference canceling method (for canceling the non-diagonal components of $T_k$ successively). Assuming that the successive canceling method is performed in an ideal manner, the equivalent signal-to-noise ratio (λm) of each transmission stream is calculated by Equation (20-1), based on the channel estimation result at the destination node 16.

$$\lambda_m = \frac{P}{M} \frac{\left(\sum_{k=1}^{k}(E_k P_k^H A_k R_k)_{m,M-m+1}\right)^2}{\sigma_r^2 \sum_{k=1}^{k} E_k \|(P_k^H A_k)_m\|^2 + \sigma_d^2} \tag{20-1}$$

where $\sigma_r^2$ and $\sigma_d^2$ are variances of noise components $n_k$ and $n_R$, respectively, and P denotes the total transmit power of the source node 12. From Equation (20-1), the communication capacity C between the source node 12 and the destination node 16 is expressed by Equation (20-2) when the rates of the streams $S_1, \ldots, S_M$ are independently controlled.

$$C = \sum_{m=1}^{M} \frac{1}{2}\log_2(1+\lambda_m) \tag{20-2}$$

Information about the rate of each stream can be reported to the source node 12 by feeding the information from the destination node back to the source node 12. The power levels of the respective streams can also be controlled independently.

As expressed in Equation (19), the non-diagonal components of $T_k$ are cancelled, and each of the signal components $S_1$ through $S_M$ of the signal vector acquired from the relay nodes 14 is multiplied by a positive real number. These matrix elements are combined at the destination node. Because the coefficients used in signal combining do not contain imaginary components (phase components), there is little need to cancel components during the signal combination, and accordingly, in-phase signal combination can be achieved at the maximum ratio. In other words, the relaying signals from the respective relay nodes 14 can be combined coherently in phase.

Because the scalar quantity $E_k$ and other coefficients are calculated based mainly on transformation of the unitary matrices, adverse influence of noise increase can be reduced, as compared with the conventional techniques. This arrangement is advantageous from the viewpoint of reduction of signal loss. Thus, degradation of signal quality, which is the technical problem in the prior art, can be solved.

Embodiment 2

Figure 5:
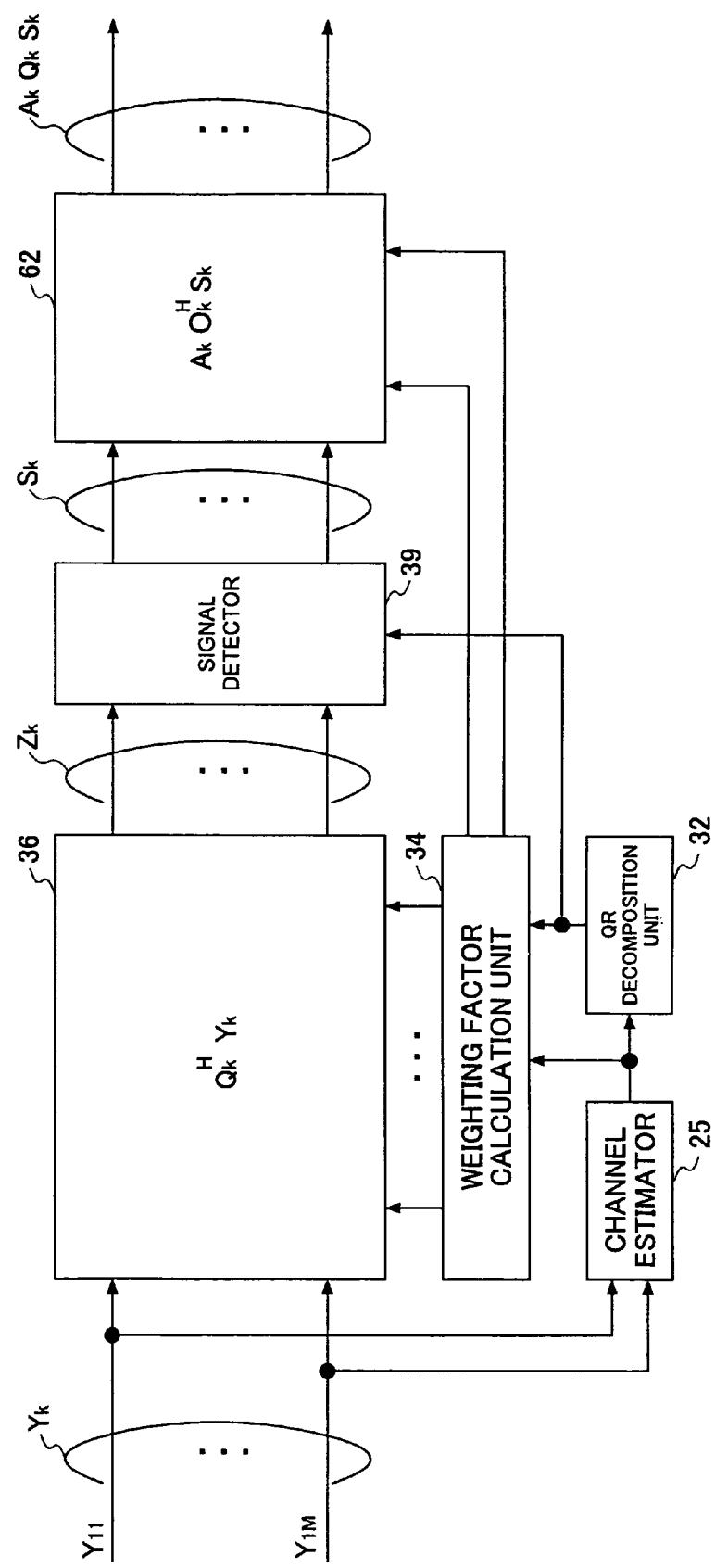
FIG. 5 is a functional block diagram of a relaying signal generator according to the second embodiment of the invention.

FIG. 5 is a functional block diagram of the relaying signal generator 26 used in the relay node 14 according to the second embodiment of the invention. The relaying signal generator 26 includes a QR decomposition unit 32, a weighting factor calculation unit 34, a first weighting unit 36, a signal detector 39, and a second weighting unit 62. In the second embodiment, the destination node 16 may have the structure and functions shown in FIG. 5, or alternatively, it may have the structure and functions shown in FIG. 3.

Upon receiving information about the channel matrices $H_k$ and $G_k$ from the channel estimator 25, the QR decomposition unit 32 breaks down the channel matrix $H_k$ in a form of product of a unitary matrix $Q_k$ and a triangular matrix $R_k$ ($H_k=Q_k R_k$). The the QR decomposition unit 32 also breaks down the channel matrix $G_k$ into the form of a product of a triangular matrix $P_k^H$ and a unitary matrix $O_k^H$ ($G_k = P_k^H O_k^H$).

The weighting factor calculation unit 34 calculates weighting factors for the received signal $Y_k$ based on the channel matrices $H_k$ and $G_k$, as well as on the information about the QR decomposition formulae.

The first weighting unit 36 multiples the received signal $Y_k$ by the weighting factor $Q_k^H$ estimated by the weighting factor calculation unit 34 in order to extract each component of the received signal.

The signal detector 39 detects the transmission signal $S_k = (S_{k1}, \ldots, S_{kM})$ transmitted from the source node 12, based on the weighted received signal output from the weighting unit 36 and information about the triangular matrix.

The second weighting unit 62 multiplies the detected transmission signal Sk by a weighting factor $A_k O_k^H$ calculated by the weighting factor calculation unit 34, and outputs each component of the relaying signal $A_k O_k^H S_k$.

Figure 6:
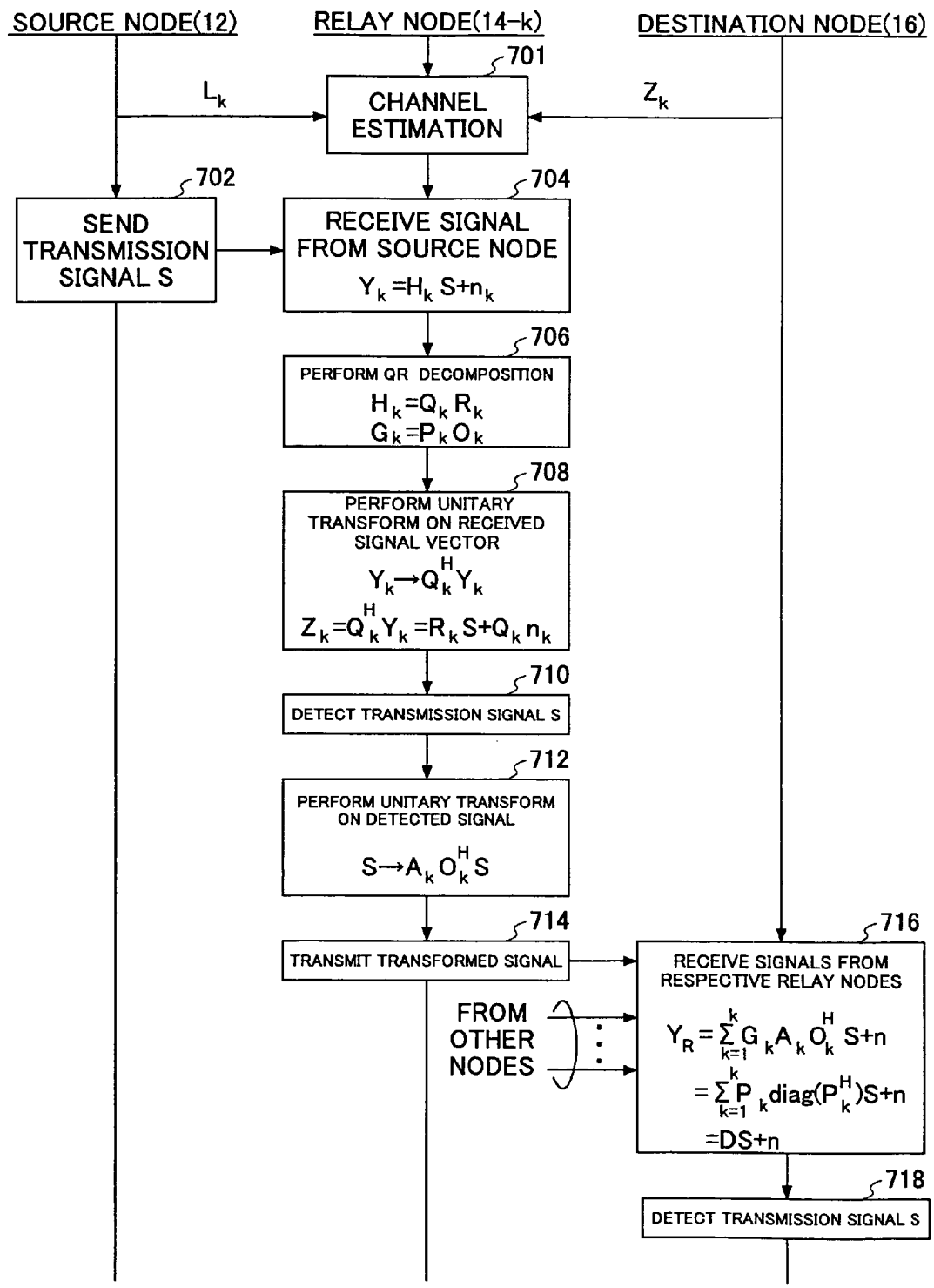
FIG. 6 is a flowchart illustrating operations of the communication system using the relaying signal generator shown in FIG. 5.

FIG. 6 is a flow chart showing the operations of the communication system according to the second embodiment of the invention.

First, the source node 12 and the destination node 16 transmit pilot signals $L_k$ and $Z_k$, respectively, which pilot signals are received at the relay node 14-k. In step 701, the relay node 14-k performs channel estimation based on the pilot signals $L_k$ and $Z_k$ to estimate a channel matrix H between the source node 12 and the relay node 14-k and a channel matrix G between the relay node 14-k and the destination node 16.

In step 702, the source node 12 transmits a transmission signal represented as a signal vector S consisting of a set of M components from M antennas to surrounding relay nodes.

In step 704, the relay node 14-k receives the signal from the source node 12. The received signal is expressed as $Y_k = H_k S + n_k$.

In step 706, QR decomposition for the channel matrices $H_k$ and $G_k$ is performed. The channel matrix $H_k$ is broken down into the form of a product of a unitary matrix $Q_k$ and a triangular matrix $R_k$ ($H_k = Q_k R_k$), and the channel matrix $G_k$ is broken down into the form of a product of a triangular matrix $P_k^H$ and a unitary matrix $O_k^H$ ($G_k = P_k^H O_k^H$).

In step 708, unitary transformation is carried out by multiplying the received signal $Y_k$ by the unitary matrix $Q^H$. The unitary-transformed received signal $Z_k$ is expressed as $$Z_k = Q_k^H Y_k$$
$$= R_k S + Q_k^H n_k.$$

Since matrix $R_k$ is an upper triangular matrix, the following relation holds if the noise is omitted.

$Z_{k1} = r_{11} S_1 + r_{12} S_2 + \ldots + r_{1M} S_M$ $Z_{k2} = r_{22} S_{12} + \ldots r_{2M} S_M$

. . .

$Z_{kM-1} = r_{M-1 \, M-1} S_{M-1} + r_{M-1 \, M} S_M$ $Z_{kM} = r_{MM} S_M$

In step 710, transmission signal S is detected from the unitary-transformed received signal. First, focusing on the M-th received signal component $Z_{kM}$, transmission signal component $S_M$ is detected based on known $Z_{kM}$ and $r_{MM}$.

Then, focusing on the (M−1)th received signal component $Z_{kM-1}$, transmission signal component $S_{M-1}$ is detected based on known $r_{M-1\,M-1}$, $r_{MM}$, and $S_M$. In a similar manner, the transmission signal components are successively detected.

In step 712, further transformation is performed by multiplying the detected transmission signal $S_k$ by $A_k O_k^H$, where matrix Ak is a diagonal matrix expressed as $$A_k = diag(P_k^H).$$

In step 714, the transformed signal $O_k^H S_k$ is transmitted as a relaying signal to the destination node 16.

In step 716, the signals relayed from all the relevant relay nodes 14 are received at the destination node 16. The received signal $Y_R$ is expressed as $$Y_R = \sum_{k=1}^{K} G_k A_k O_k^H S + n \quad (21)$$
$$= \sum_{k=1}^{K} P_k \mathrm{diag}(P_k^H) S + n$$
$$= DS + n$$

where n denotes a noise component. Equation (21) makes use of the fact that the channel matrix Gk can be broken down into the form of $Gk = P_k O_k$. Because $P_k$ is a triangular matrix, the sum (or combination) of the K matrices $P_k$ also becomes a triangular matrix. The combination result is expressed as matrix D (with elements dij). Information about the triangular matrix Pk and the unitary matrix Ok may be determined by performing QR decomposition at the destination node 16, or alternatively, collected from each of the relay nodes 14. Equation (21) is developed into the following form if the noise component is omitted.

$$Y_{R1} = d_{11} S_1 + d_{12} S_2 + \ldots + d_{1M} S_M$$

$$Y_{R2} = d_{22} S_2 + \ldots + d_{2M} S_M$$

$$\ldots$$

$$Y_{RM-1} = d_{M-1\,M-1} S_{M-1} + d_{M-1\,M} S_M$$

$$Y_{RM} = d_{MM} S_M$$

In step 718, transmission signal S is detected at the relay node 16. First, focusing on the M-th received signal component $Y_{RM}$, transmission signal component $S_M$ is detected based on known $z_{RM}$ and $d_{MM}$. Then, focusing on the (M−1)th received signal component $Y_{RM-1}$, transmission signal component $S_{M-1}$ is detected based on known $d_{M-1\,M-1}$, $d_{M-1\,M}$, and $S_M$. In a similar manner, the transmission signal components are successively detected.

In the second embodiment, the destination node 16 does not have to perform unitary transformation in step 716 in FIG. 6.

Embodiment 3

Figure 7A:
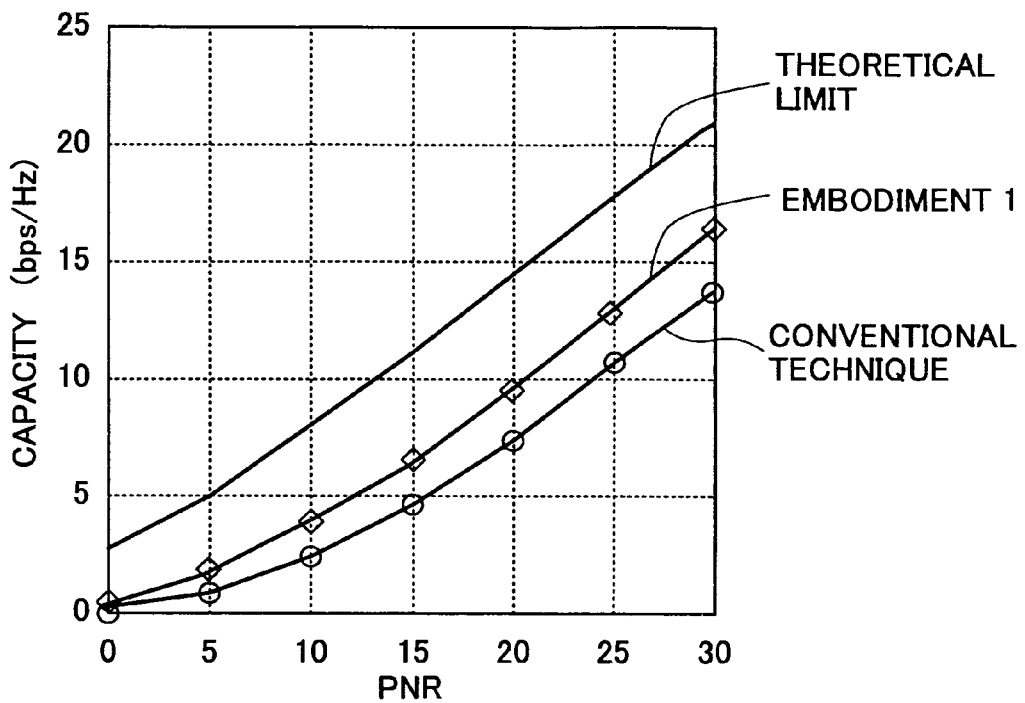
FIG. 7A and FIG. 7B are graphs showing simulation results of the present invention according to the third embodiment of the invention.
Figure 7B:
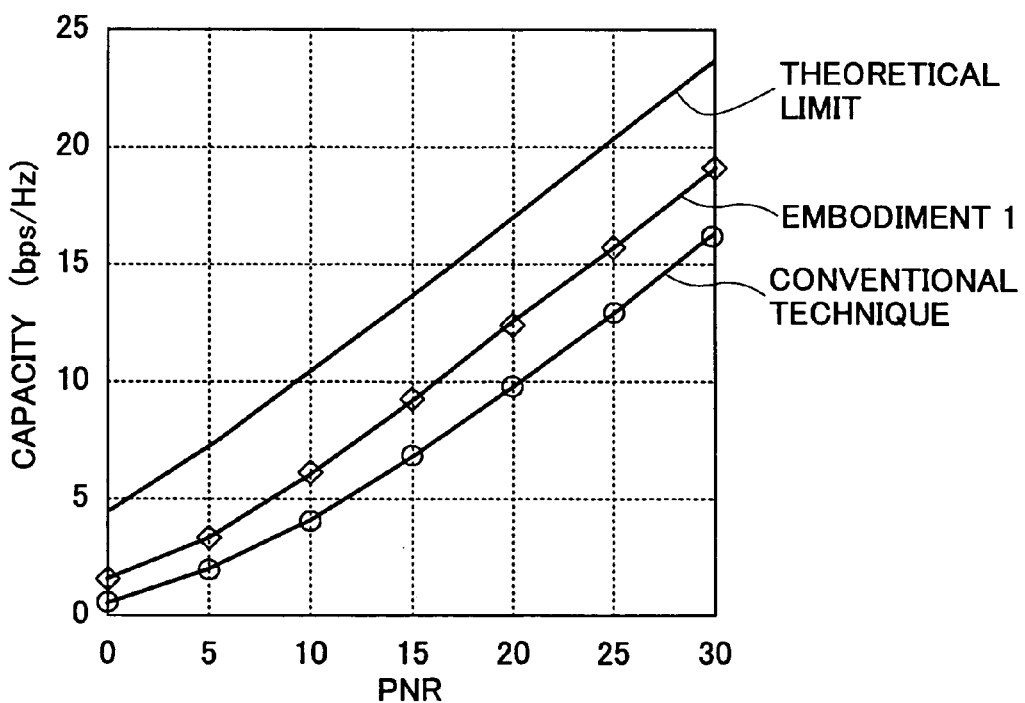

FIG. 7A and FIG. 7B are graphs showing simulation results of signal transmission according to an embodiment of the invention. The horizontal axis represents power to noise ratio (PNR), and the vertical axis represents capacity. In FIG. 7A, the number of transmission antennas and the number of receiving antennas are each four, and two relay nodes (K=2) are located between the source node and the destination node within a one-hop communication range. The curve of theoretical limit indicates the theoretical limit of the capacity as a function of PNR, and the curve of the prior art indicates the capacity when relaying signals using the zero-forcing method. The curve of Embodiment 1 is obtained by implementing the method of the first embodiment. In FIG. 7B, the number of transmission antennas and the number of receiving antennas are each four, and four relay nodes (K=4) are located between the source node and the destination node within a one-hop communication range. From the graphs of FIG. 7A and FIG. 7B, it is understood that as the transmit power increases, the system capacity increases, and that the method of Embodiment 1 is superior to the conventional method in achieving sufficient capacity.

Embodiment 4

In the fourth embodiment, transmission signals are relayed among multiple source nodes and multiple destination nodes via one or more relay nodes.

FIG. 8 is a schematic diagram of a wireless communication system according to the fourth embodiment of the invention. The system includes L source nodes 802-1 through 802-L, each having M antennas, K relay nodes 804-1 through 804-K, each having N antennas, and L destination nodes 806-1 through 806-L, each having M antennas. The integers N, M and L satisfy the relation N≧L*M. In this example, all the source nodes and the destination nodes have M antennas, and all the relay nodes have N antennas for simplification purpose. Of course, these nodes may have different numbers of antennas, as long as the number of antennas of a source node is equal to or less than that of a destination node.

As is explained above in conjunction with FIG. 1, the channel condition between a source node 802-$l$ with M antennas and a relay node 804-$k$ with N antennas is expressed by an N×M channel matrix $H_{1,\,k}$. Similarly, the channel condition between a relay node 804-K and a destination node 806-$l$ with M antennas is expressed by an M×N channel matrix $G_{k,\,1}$ (which may be simply expressed as $G_{k1}$).

Transmission signals from multiple source nodes are received at and relayed by the relay nodes. A destination node, to which a signal transmitted from a source node is addressed, receives signals from multiple relaying nodes, and restores the signals from that source node. Accordingly, the signal received at the destination node is subjected to the influence (interference) of signals transmitted from other source nodes, other than the transmission signal from the desired source node. The destination node has to detect the desired transmission signal by removing the interference.

Prior to describing the signal processing of the fourth embodiment, explanation is made of general signal processing in a conventional communication system (described in, for example, above-described Rohit U. Nabar, et al.).

FIG. 9 is a schematic functional diagram of one of conventional relay nodes (the k-th relay node). The relay node has L receiving filters 902-1 through 902-L provided corresponding to the number L of source nodes, L transmission filters 904-1 through 904-L, and a signal combining unit 906.

The received signal $Y_k$ at the relay node is distributed to L receiving filters 902-1 through 902-L. Since the received signal $Y_k$ includes signals from L source nodes, it is expressed as $$y_k = \sum_{l=1}^{L} H_{l,k} s_l + n_k \quad (30)$$

($N \times 1$ MATRIX)

where $s_l$ is a transmission signal vector sent from the l-th source node with M signal components $(S_{l1}, S_{l2}, \ldots, S_{lM})$, and $n_k$ denotes a noise component introduced between the k-th relay node and the multiple source nodes. The dimension of the received signal is N×1.

The l-th receiving filter **902-*l*** multiplies the receiving signal $Y_k$ expressed in M vector components by a weighting matrix $w^b_{k,l}$. The weighting matrix $w^b_{k,l}$ is an M×N matrix and satisfies the relation $$\left[w^{bT}_{k,1} \ldots w^{bT}_{k,l} \ldots w^{bT}_{k,L}\right]^T = (H^H_k \cdot H_k)^{-1} \cdot H^H_k \quad (31\text{-}1)$$

($ML \times N$ MATRIX)

which relational expression indicates an ML×N matrix. $H_k$ is a matrix encompassing multiple channel matrices, and defined as $$H_k = [H_{lk}, \ldots, H_{Lk}]. \quad (31\text{-}2)$$

It is understood from Equations (31-1) and (31-2) that $w^b_{k,l}$ and $H_{lk}$ are orthogonal to each other. Making use of this orthogonality, the receiving filter **902-*l*** multiplies the received signal $y_k$ by the weighting matrix $w^b_{k,l}$ to convert the received signal vector to $y'_{k,l}$, as indicated by Equation (32).

$$\begin{aligned} y'_{k,l} &= W^b_{k,l} y_k \\ &= s_l + W^b_{k,l} n_k \end{aligned} \quad (32)$$

($M \times 1$ MATRIX)

Then, the transmission filter **904-*l*** multiplies the converted received signal $y'_{k,l}$ by another weighting matrix $w^f_{k,l}$. This weighting matrix $w^f_{k,l}$ is an N×M matrix, and satisfies the relation $$\left[W^f_{k,1} \ldots W^f_{k,l} \ldots W^f_{k,L}\right] = G^H_k (G_k \cdot G^H_k)^{-1} \quad (33)$$

($N \times ML$ MATRIX)

which relational expression indicates an N×ML matrix. $G_k$ is a matrix encompasses multiple channel matrices, and defined as $$G_k = [G_{lk}, \ldots, G_{Lk}]. \quad (34)$$

The multiplied signal $w^f_{k,l} * y'_{k,l}$ is supplied to a signal combining unit 906. The signal combining unit 906 combines the output signals from the transmission filters 904-1 through 904-L to generate a relaying signal $X_k$. The relaying signal $x_k$ is expressed as $$x_k = E_k \sum_{l=1}^{L} W^f_{k,l} \cdot y'_{k,l} \quad (35)$$

($N \times 1$ MATRIX)

where $E_k$ is a scalar quantity for normalizing the transmit power of the relaying node. The relaying signal $x_k$ is transmitted to the destination node.

Among multiple destination nodes, the l-th destination node **806-*l*** receives signals from K relay nodes, each of the signals reflecting a transmission signal transmitted from the l-th source node and addressed to the l-th destination node. Accordingly, the received signal $r_l$ at the l-th destination node is expressed as $$\begin{aligned} r_l &= \sum_{k=1}^{K} G_{k,l} x_k \\ &= \sum_{k=1}^{K} (E_k s_l + E_k W^b_{k,l} n_k) + z_l \end{aligned} \quad (36)$$

($M \times 1$ MATRIX)

where $z_l$ denotes a noise component introduced between the multiple relay nodes and the l-th destination node. The received signal $r_l$ defined in Equation (36) is estimated making use of the orthogonal relation between the channel matrix $G_{k,l}$ and a weighting matrix $W^f_{k,l}$.

In Equation (36), each component of the received signal $r_l$ linearly depends on the corresponding signal component of the desired transmission signal $s_l$. Accordingly, the desired transmission signal $s_l$ can be detected directly from the received signal without performing complicated signal separation generally performed in a MIMO scheme.

However, with this method, the noise $n_k$ is amplified by the weighting factor $W^b_{k,l}$, and accordingly, degradation of the received signal quality at the destination node is a concern. The contribution to the noise amplification by the weighting matrix may be reduced by setting the coefficient $E_k$ small. However, since the coefficient $E_k$ is also used for the desired signal $s_l$, the desired signal component becomes small with the decreased coefficient $E_k$. With the conventional technique, signal detection precision may be degraded at the destination node.

FIG. 10 is a functional block diagram illustrating a relay node according to the fourth embodiment of the invention. This relay node is one of the relay nodes (the k-th relay node **804-*k*) illustrated in FIG. 8. The other relay nodes also have the same structure and function. The relay node 804-*k* has L receiving filters 1002-1 through 1002-L, L receiving filter estimators 1004-1 through 1004-L, L intermediate filters 1006-1 through 1006-L, L intermediate filter estimator 1008-1 through 1008-L, L transmission filters 1010-1 through 1010-L, L transmission filter estimator 1012-1 through 1012-L, and a signal combining unit 1014**.

Figure 11:
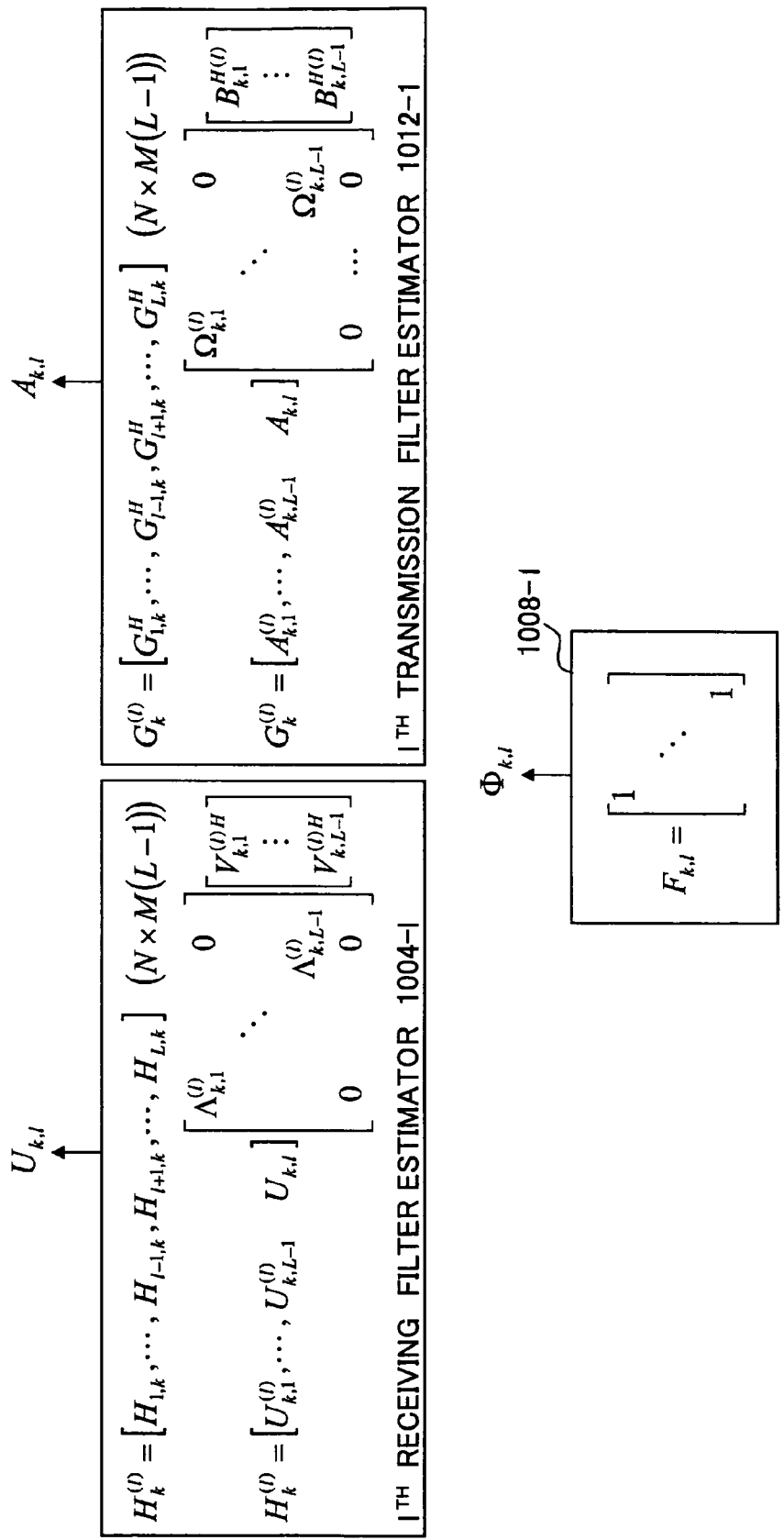
FIG. 11 is a diagram illustrating an example of the arithmetic operation carried out at the relay node.

FIG. 11 is a diagram showing the arithmetic operations performed at the l-th receiving filter estimator **1004-*l*, the l-th intermediate filter estimator 1008-*l*, and the l-th transmission filter estimator 1012-*l***.

As illustrated in FIG. 10, the signal $y_k$ received at the k-th relay node is distributed in the L receiving filters 1002-1 through 1002-L. Because the received signal $y_k$ contains the signals from L source nodes, it is expressed by above-described Equation (30).

The l-th ($1 \leq l \leq L$) receiving filter 1002-*l* multiplies the received signal $y_k$ expressed by M vector components by a first unitary matrix $U_{kl}$. The first unitary matrix $U_{kl}$ has dimensions of N lines and N-M(L-1) columns (N≧LM), and is estimated by the receiving filter estimator 1004-*l*.

Among the L channel matrices between the focused (k-th) relay node 804-*k* and the L source nodes, the l-th receiving filter estimator 1004-*l* considers matrix $H^{(l)}_k$ containing L-1 channel matrices, other than one between the l-th source node and the relay node 804-*k*, which matrix is expressed as $$H^{(l)}_k = [H_{1,k}, \ldots, H_{l-1,k}, H_{l+1,k}, \ldots, H_{L,k}]. \tag{37}$$

It should be noted that, unlike Equation (31-2), matrix $H^{(l)}_k$ does not contain channel matrix $H_{lk}$. Accordingly, $H_k$ has dimensions of N lines and M(L-1) columns. The above-described first unitary matrix $U_{kl}$ is acquired by performing singular value decomposition involving matrix $H^{(l)}_k$, as represented by Equation (38).

$$H^{(l)}_k = [U^{(l)}_{k,1} \ldots U^{(l)}_{k,L-1} \; U_{k,L}] \begin{bmatrix} \Lambda^{(l)}_{k,1} & & O \\ & \ddots & \\ & & \Lambda^{(l)}_{k,L-1} \\ O & & O \end{bmatrix} \begin{bmatrix} V^{(l)H}_{k,1} \\ \vdots \\ V^{(l)H}_{k,L-1} \end{bmatrix} \tag{38}$$

$(N \times M(L-1) \text{MATRIX})$

In Equation (38), each of $\Lambda^{(l)}_{k,1}, \ldots, \Lambda^{(l)}_{k,L-1}$ is a M×M diagonal matrix, and its diagonal component is a singular value of $H^{(l)}_k$. Matrix $[U^{(l)}_{k,1}, \ldots, U^{(l)}_{k,L-1}]$ has dimensions of N lines and M(L-1) columns, and consists of base vectors of a signal space defined by matrix $H^{(l)}_k$. Similarly, $[V^{(l)}_{k,1}, \ldots, V^{(l)}_{k,L-1}]^T$ consists of base vectors of the signal space defined by matrix $H^{(l)}_k$, and is expressed by a M(L-1)×M(L-1) square matrix. $U_{k,l}$ is the first unitary matrix with dimensions of N lines and N-M(L-1) columns. This matrix corresponds to a base vector of the Null space of the above-described signal space.

The l-th receiving filter 1002-*l* multiplies the received signal $y_{kl}$ by the first unitary matrix $U^H_{kl}$ to convert the received signal vector to $y'_{k,l}$, as expressed by Equation (39).

$$y'_{k,l} = U^H_{k,l} y_k \tag{39}$$

$$= U^H_{k,l} H_{l,k} s_l + U^H_{k,l} n_k$$

Because the first unitary matrix $U_{kl}$ corresponds to a base vector of the Null space of the signal space defined by $H^{(l)}_k$, the transmission signal from the l-th source node can be separated from those from the other source nodes when multiplying the received signal by the first unitary matrix. It should be noted that, unlike Equation (32), the interference between signal components transmitted from the l-th source node is not removed. Instead, amplification of the noise component $n_k$ is prevented at this stage.

The l-th intermediate filter 1006-*l* multiplies the converted received signal $y'_{kl}$ by a transformation matrix $\Phi_{kl}$, which matrix is produced by the intermediate filter estimator 1008-*l*. However, in this embodiment, the transformation matrix $\Phi_{kl}$ is a unit matrix, and therefore, the intermediate filter 1006-*l* and the intermediate filter estimator 1008-*l* do not perform particular processes. Of course, the intermediate filter estimator 1008-1 may produce a matrix different from the unit matrix, as described below in another embodiment.

The l-th transmission filter 1010-*l* multiplies the converted received signal $y'_{kl}$ by a second unitary matrix $A_{kl}$. The second unitary matrix has dimensions of N lines and N-M(L-1) columns (N≧LM), and is produced by the transmission filter estimator 1012-*l*.

Among the L channel matrices between the focused (k-th) relay node 804-*k* and the L destination nodes, the l-th transmission filter estimator 1012-*l* considers matrix $G^{(l)}_k$ containing L-1 channel matrices, other than one between the l-th destination and the relay node 804-*k*, which matrix is expressed as $$G^{(l)}_k = [G^H_{1,k}, \ldots, G^H_{l+1,k}, G^H_{l+1,k}, \ldots, G^H_{L,k}] \tag{40}$$

It should be noted that, unlike Equation (34), matrix $G^{(l)}_k$ does not contain channel matrix $G_{lk}$. Accordingly, $G^{(l)}_k$ has dimensions of N lines and M(L-1) columns. The above-described second unitary matrix $A_{kl}$ is acquired by perform singular value decomposition for matrix $G^{(l)}_k$, as represented by Equation (40).

$$G^{(l)}_k = [A^{(l)}_{k,1} \ldots A^{(l)}_{k,L-1} \; A_{k,L}] \begin{bmatrix} \Omega^{(l)}_{k,1} & & O \\ & \ddots & \\ & & \Omega^{(l)}_{k,L-1} \\ O & & O \end{bmatrix} \begin{bmatrix} B^{H(l)}_{k,1} \\ \vdots \\ B^{H(l)}_{k,L-1} \end{bmatrix} \tag{40}$$

$(N \times M(L-1) \text{MATRIX})$

In Equation (40), each of $\Omega^{(l)}_{k,1}, \ldots, \Omega^{(l)}_{k,L-1}$ is a M×M diagonal matrix, and its diagonal component is a singular value of $G^{(l)}_k$. Matrix $[A^{(l)}_{k,1}, \ldots, A^{(l)}_{k,L-1}]$ has dimensions of N lines and M(L-1) columns, and consists of base vectors of a signal space defined by matrix $G^{(l)}_k$. Similarly, $[B^{(l)}_{k,1}, \ldots, B^{(l)}_{k,L-1}]^T$ consists of base vectors of the signal space defined by matrix $G^{(l)}_k$, and is expressed by a M(L-1)×M(L-1) square matrix. $A_{k,l}$ is the second unitary matrix with dimensions of N lines and N-M(L-1) columns. This matrix corresponds to a base vector of the Null space of the above-described signal space.

The l-th transmission filter 1010-*l* multiplies the signal $y'_{kl}$ by the second unitary matrix $A_{kl}$. The multiplied signal $A_{kl} y'_{kl}$ is supplied to the signal combining unit 1014. The signal combining unit 104 combines the signal outputs from the transmission filters 1010-1 through 1010-L to produce a relaying signal $x_k$. The relaying signal $x_k$ is expressed as $$x_k = E_k \sum_{l=1}^{L} A_{k,l} U^H_{k,l} \cdot y_k$$

$$= E_k \sum_{l=1}^{L} A_{kl} U^H_{kl} H_{kl} s_l + E_k \sum_{l=1}^{L} A_{kl} U^H_{kl} n_k$$

$(N \times 1 \text{ MATRIX})$ where $E_k$ is a scalar quantity for normalizing the transmit power of the relay node 804-*k*. The relaying signal $x_k$ is transmitted to the destination node.

Among the multiple destination nodes, the l-th destination node 806-*l*, to which the transmission signal from the l-th source node 802-*l* is addressed, receives K relaying signals from K relay nodes. The signal $r_l$ received at the l-th destination node 806-*l* is expressed as $$r_l = \sum_{k=1}^{K} G_{k,l} x_k \qquad (41)$$

$$= \sum_{k=1}^{K} E_k G_{k,l} A_{k,l} U_{k,l}^H H_{l,k} s_l + \sum_{k=1}^{K} E_k G_{k,l} A_{k,l} U_{k,l}^H n_k + z_l$$

($M \times 1$ MATRIX)

where $z_l$ is a noise component introduced between the multiple relay nodes and the l-th destination node. Equation (41) is estimated by making use of the fact that the channel matrix $G_{kl}$ and the second unitary matrix $A_{kl}$, are orthogonal to each other if l . l'. If l=l', then the matrix expressed by $G_{kl}A_{kl}$ is a general matrix other than the unit matrix.

As is clearly indicated by Equation (41), the transmission signal $s_l$ from the desired source node is separated from other transmission signals $s_{l'}$ (l'≠l) from the other source node in the received signal $r_l$. In other words, interference between source nodes is sufficiently reduced; however, there is interference remaining between signal components within the transmission signal from the desired source node. This is because, in general, the matrix expressed by $G_{kl}A_{kl}U^H_{kl}H_{lk}$ is not a diagonal matrix. Accordingly, the destination node has to perform ordinary signal separation generally carried out in a MIMO scheme to detect the desired signal $s_l$ from the received signal. The signal detection itself may become a little more complicated, as compared with the conventional technique.

However, this method has an advantage that amplification of the noise $n_k$ can be prevented at the relay node. In Equation (41), G is a matrix that is inevitably introduced, among those matrices multiplied by the noise $n_k$. The matrices $A_{kl}$ and $U_{kl}$ do not amplify the noise because these matrices are unitary matrices. Accordingly, it is unnecessary to employ as small the coefficient $E_k$ as in Equation (36) in which the noise is amplified by the weighting matrix $W^b_{kl}$. This means that degradation in signal detection accuracy, which is a concern in the conventional technique, can be removed or reduced by the present embodiment.

Embodiment 5

Figure 12:
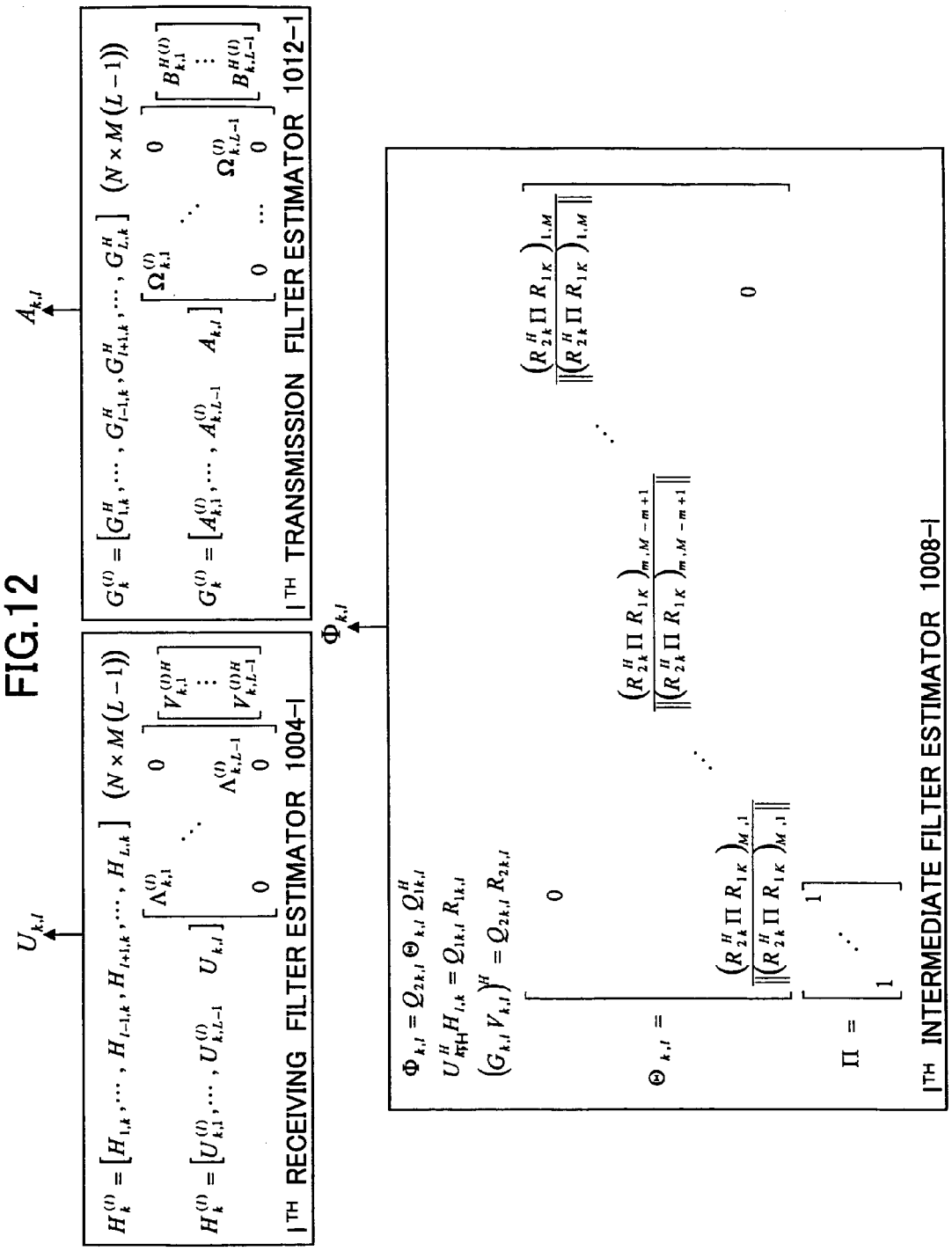
FIG. 12 is a diagram illustrating another example of the arithmetic operation carried out at the relay node.

FIG. 12 is a diagram showing another example of the arithmetic operations performed at the l-th receiving filter estimator 1004-l, the l-th intermediate filter estimator 1008-1, and the l-th transmission filter estimator 1012-1. The operations performed by the receiving filter 1002-l, the receiving filter estimator 1004-l, the transmission filter 1010-l, and the transmission filter estimator 1012-l are the same as those in the fourth embodiment.

In the fifth embodiment, the i-th intermediate filter 1006-l multiplies the signal y'$_{kl}$ output from the receiving filter 1004-1 by a transformation matrix $\Phi_{kl}$ to produce a signal $\Phi_{kl}$y'$_{kl}$. The transformation matrix $\Phi_{kl}$ is calculated by the l-th intermediate filter estimator 1008-l.

The intermediate filter estimator 1008-l performs QR decomposition on matrix $U^H_{kl}H_{lk}$ as represented by Equation (50).

$$U^H_{kl}H_{lk}=Q_{1kl}R_{1kl} \qquad (50)$$

where $Q_{1kl}$ is a unitary matrix with dimensions of N-M(L-1) lines and M columns, and $R_{1kl}$ is an M×M upper right triangular matrix. Similarly, the intermediate filter estimator 1008-l performs QR decomposition on matrix $(G^H_{kl}A_{lk})^H$, as represented by Equation (50).

$$(G^H_{kl}A_{lk})^H=Q_{2kl}R_{2kl} \qquad (51)$$

where $Q_{2kl}$ is a unitary matrix with dimensions of N-M(L-1) lines and M columns, and $R_{2kl}$ is an M×M upper right triangular matrix. The intermediate filter estimator 1008-1 further estimates a matrix $\Theta_{kl}$ using a triangular matrix satisfying Equations (50) and (51). The matrix $\Theta_{kl}$ is expressed as $$\Theta_{k,l} = \begin{bmatrix} & & & & & \frac{(R^H_{2k,l}\Pi R_{1k,l})_{1,M}}{\|(R^H_{2k,l}\Pi R_{1k,l})_{1,M}\|} \\ O & & & & \ddots & \\ & & & \frac{(R^H_{2k,l}\Pi R_{1k,l})_{m,M-m+1}}{\|(R^H_{2k,l}\Pi R_{1k,l})_{m,M-m+1}\|} & & \\ & & \ddots & & & \\ \frac{(R^H_{2k,l}\Pi R_{1k,l})_{M,1}}{\|(R^H_{2k,l}\Pi R_{1k,l})_{M,1}\|} & & & & & O \end{bmatrix} \qquad (52)$$

where matrix $\Pi$ is defined by $$\Pi = \begin{bmatrix} & & 1 \\ & \ddots & \\ 1 & & \end{bmatrix}. \qquad (52)'$$

Using these estimated matrices, the intermediate filter estimator 1008-l estimates the transformation matrix $\Phi_{kl}$ defined by $$\Phi_{kl}=Q_{2kl}\Theta_{kl}Q^H_{1kl}. \qquad (53)$$

This matrix $\Phi_{kl}$ is a (N-M(L-1))×(N-M(L-1)) matrix.

The l-th intermediate filter 1006-l outputs the signal $\Phi_{kl}$y'$_{kl}$ to the transmission filter 1010-l. The transmission filter 1010-l multiplied the input signal by a matrix $A_{kl}$, which matrix is described in the fourth embodiment, and outputs the multiplied signal to the signal combining unit 1014. The signal combining unit 1014 adds up the signals from the L transmission filters 1010-1 through 1010-L, and outputs a relaying signal $x_k$. This relaying signal $x_k$ is expressed as $$X_k = E_k \sum_{l=1}^{L} A_{kl} \Phi_{kl} y'_{kl} \qquad (54)$$

$$= E_k \sum_{l=1}^{L} A_{kl} (Q_{2kl} \Theta_{kl} Q_{1kl}^H)(U_{kl}^H H_{lk} s_l + U_{kl}^H n_k)$$

$$= E_k \sum_{l=1}^{L} A_{kl} Q_{2kl} \Theta_{kl} (R_{1kl} s_l + Q_{1kl}^H U_{kl}^H n_k)$$

$$= E_k \sum_{l=1}^{L} A_{kl} Q_{2kl} \Theta_{kl} R_{1kl} s_l + E_k \sum_{l=1}^{L} A_{kl} \Phi_{kl} U_{kl}^H n_k$$

where $E_k$ is a scalar quantity for normalizing the transmit power of the relay node 804-$k$. In estimating the relaying signal $x_k$, Equations (39) and (50) are used. The estimated relaying signal $x_k$ is transmitted to the destination node.

Among the multiple destination nodes, the l-th destination node 806-$l$, to which the signal transmitted from the l-th source node 802-$l$ is addressed, receives the relaying signals from K relay nodes. Accordingly, the signal $r_l$ received at the l-th destination node 806-$l$ is expressed as $$r_l = \sum_{k=1}^{K} G_{k,l} x_k \qquad (55)$$

$$= \sum_{k=1}^{K} E_k R_{2k,l}^H \Theta_{k,l} R_{1k,l} s_l + \sum_{k=1}^{K} E_k G_{k,l} A_{k,l} \Phi_{k,l} U_{k,l}^H n_k + z_l$$

($M \times 1$ MATRIX)

where $z_l$ is a noise component introduced between the multiple relay nodes and the l-th destination node. Equation (55) is estimated by making use of the fact that the channel matrix $G_{kl}$ and the second unitary matrix $A_{kl'}$ are orthogonal to each other if $l \neq l'$. The fact that Equation (51) holds when $l=l'$ is also used.

As is clearly indicated by Equation (55), the transmission signal $s_l$ from the desired source node is separated from other transmission signals $s_{l'}$ ($l' \neq l$) from the other source nodes in the received signal $r_l$. In other words, interference between source nodes is sufficiently reduced; however, there is interference remaining between signal components within the transmission signal from the desired source node. Accordingly, the destination node has to perform ordinary signal separation generally carried out in a MIMO scheme to detect the desired signal $s_l$ from the received signal.

By the way, the matrix $R^H_{2k} \Theta_{kl} R_{1kl}$ acting on the transmission signal $s_l$ is a lower right triangular matrix, as is understood from the definition of each matrix. Accordingly, the signal components of the transmission signal $s_l$ can be determined successively one after another if one of the signal components depending only on the top right matrix element (for example, $s_{lM}$) is determined. Consequently, the operational workload for signal separation can be reduced, as compared with the fourth embodiment.

In addition, the matrix elements aligning from the top right to the bottom left of the lower right triangular matrix, that is, those elements with the sum of the line number and the column number (i+j) being equal to a prescribed number (column number plus 1) affect the transmission signal $s_l$ more greatly than the other matrix elements. Such matrix elements are positive real numbers, and do not contain an imaginary component. Therefore, the dominant portions of the contribution $\Sigma E_k R^H_{2k} \Theta_{kl} R_{1kl}$ from the L relay nodes are combined in phase, and the signal-to-noise power ratio can be improved at the destination node. Furthermore, noise $n_k$ is not amplified by $A_{kl}$ and $U_{kl}$ because these matrices are unitary matrices. Consequently, accuracy in signal detection at the destination node can be further improved.

Figure 15:
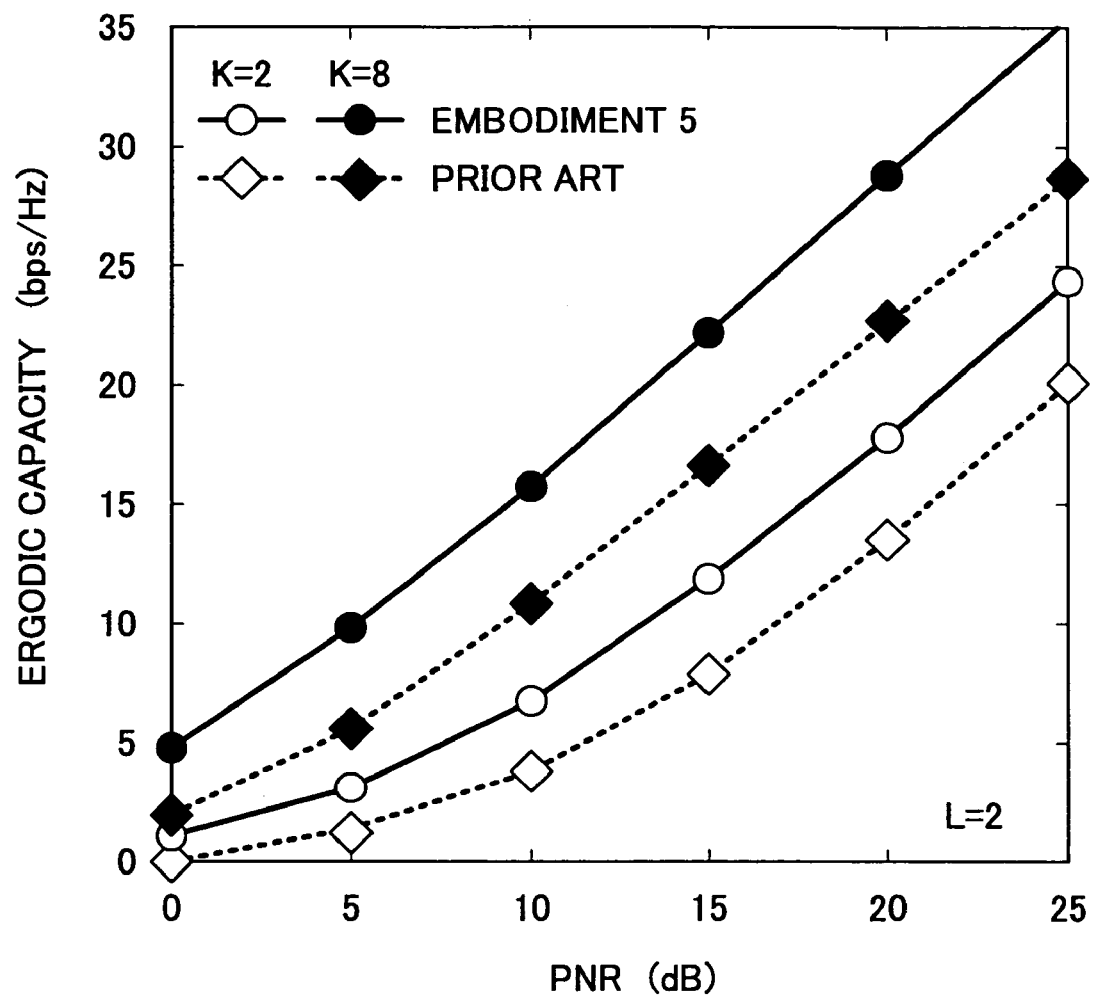
FIG. 15 is a graph showing simulation result of the present invention, as comparison with the prior art.

FIG. 15 is a graph showing simulation results of the fifth embodiment, in comparison with the prior art. The graph shows the ergodic capacity as a function of power to noise ratio (PNR). The methods of the fifth embodiment and the prior art technique are simulated for the number of relay nodes K=2 and K=8. The number of source nodes and the number of destination nodes are also two. The number of antennas of the source node and the destination node is four (4), and the number of antennas of the relay node is eight (8). In general, as the PNR increases (that is, as the signal power level increases), the capacity increases. As the number of relay nodes increases, the higher the capacity becomes. As is clearly shown in the graph, the technique of the fifth embodiment is superior to the prior art technique, showing about 5 bps/Hz improvement in capacity with the same number of relay nodes.

Embodiment 6

Figure 13:
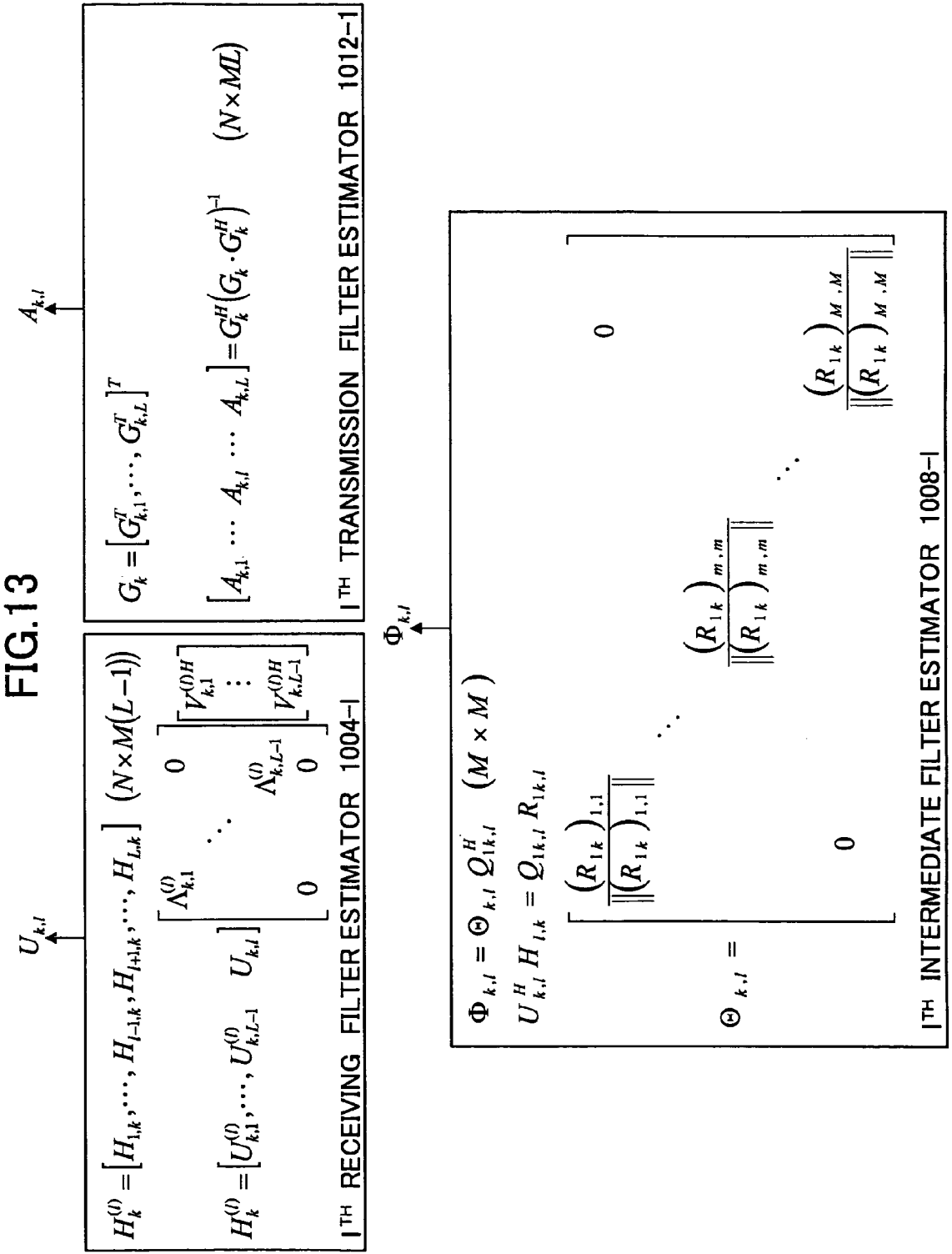
FIG. 13 is a diagram illustrating still another example of the arithmetic operation carried out at the relay node.

FIG. 13 is a diagram showing still another example of the arithmetic operations performed at the l-th receiving filter estimator 1004-$l$, the l-th intermediate filter estimator 1008-1, and the l-th transmission filter estimator 1012-1. The operations performed by the receiving filter 1002-$l$ and the receiving filter estimator 1004-$l$ are the same as those described in the fourth embodiment. The operations performed by the transmission filter 1010-$l$, and the transmission filter estimator 1012-$l$ are the same as those in the know technique.

In the sixth embodiment, the i-th intermediate filter 1006-$l$ multiplies the signal $y'_{kl}$ output from the receiving filter 1004-1 by a transformation matrix $\Phi_{kl}$ to produce a signal $\Phi_{kl} y'_{kl}$. The transformation matrix $\Phi_{kl}$ is calculated by the l-th intermediate filter estimator 1008-$l$.

The intermediate filter estimator 1008-$l$ performs QR decomposition on matrix $U^H_{kl} H_{lk}$ as represented by Equation (60).

$$U^H_{kl} H_{lk} = Q_{1kl} R_{1kl} \qquad (60)$$

where $Q_{1kl}$ is a unitary matrix with dimensions of N-M(L-1) lines and M columns, and $R_{1kl}$ is an M×M upper right triangular matrix. Using the triangular matrix satisfying Equation (60), the intermediate filter estimator 1008-$l$ estimates a matrix $\Theta_{kl}$ expressed by $$\Theta_{k,l} = \begin{bmatrix} \frac{(R_{1k,l})_{1,1}}{\|(R_{1k,l})_{1,1}\|} & & & O \\ & \ddots & & \\ & & \frac{(R_{1k,l})_{m,m}}{\|(R_{1k,l})_{m,m}\|} & \\ & & & \ddots \\ O & & & \frac{(R_{1k,l})_{M,M}}{\|(R_{1k,l})_{M,M}\|} \end{bmatrix} \qquad (60)'$$

Based on the above-described matrices, the intermediate filter estimator 1008-1 finally estimates a transformation matrix $\Phi_{kl}$ expressed by $$\Phi_{kl} = \Theta_{kl} Q^H_{1kl}. \quad (61)$$

where $\Phi_{kl}$ is a M×(N-M(L-1)) matrix.

The l-th intermediate filter 1006-*l* outputs the signal $\Phi_{kl} y'_{kl}$ to the transmission filter 1010-*l*. Operations performed by the transmission filter 1010-*l* and the transmission filter estimator 1012-1 are the same as those performed in the conventional technique. Accordingly, L matrices $A_{kl}$ (l=1, ..., L) are determined ($w^f_{kl} = A_{kl}$) so as to satisfy $$[A_{k1}, \ldots, A_{lL}] = G^H_k (G_k G_k^H)^{-1},$$

where $G_k$ is defined as $$G_k = [G^H_{k1}, \ldots, G^H_{kL}].$$

The transmission filter 1010-1 multiplies the input signal by the matrix $A_{kl}$, and outputs the multiplied signal.

The output of the transmission filter 1010-1 is connected to the input to the signal combining unit 1014. The signal combining unit 1014 produces a relaying signal $x_k$, which signal is expressed as $$X_k = E_k \sum_{l=1}^{L} A_{kl} \Phi_{kl} y'_{kl} \quad (62)$$

$$= E_k \sum_{l=1}^{L} A_{kl} (\Theta_{kl} Q^H_{1kl}) (U^H_{kl} H_{lk} s_l + U^H_{kl} n_k)$$

$$= E_k \sum_{l=1}^{L} A_{kl} \Theta_{kl} R_{1kl} s_l + E_k \sum_{l=1}^{L} A_{kl} \Phi_{kl} U^H_{kl} n_k$$

where $E_k$ is a scalar quantity for normalizing the transmit power of the relay node 804-*k*. In estimating the relaying signal $x_k$, Equations (39) and (60) are used. The estimated relaying signal $x_k$ is transmitted to the destination node.

Among the multiple destination nodes, the l-th destination node 806-*l*, to which the signal transmitted from the l-th source node 802-*l* is addressed, receives the relaying signals from K relay nodes. Accordingly, the signal $r_l$ received at the l-th destination node 806-*l* is expressed as $$r_l = \sum_{k=1}^{K} G_{k,l} x_k \quad (63)$$

$$= \sum_{k=1}^{K} E_k \Theta_{k,l} R_{1k,l} s_l + \sum_{k=1}^{K} E_k \Phi_{k,l} U^H_{k,l} n_k + z_l$$

(*M* × 1 MATRIX)

where $z_l$ is a noise component introduced between the multiple relay nodes and the l-th destination node. Equation (63) is estimated by making use of the fact that the channel matrix $G_{kl}$ and the unitary matrix $A_{kl}$, are orthogonal to each other.

As is clearly indicated by Equation (63), the transmission signal $s_l$ from the desired source node is separated from other transmission signals $s_{l'}$ (l'≠l) from the other source node in the received signal $r_l$, and interference between source nodes is sufficiently reduced. However, there is interference remaining between signal components within the transmission signal from the desired source node. Accordingly, the destination node has to perform ordinary signal separation generally carried out in a MIMO scheme to detect the desired signal $s_l$ from the received signal.

By the way, the matrix $\Theta_{kl} R_{1kl}$ acting on the transmission signal $s_l$ is an upper right triangular matrix, as is understood from the definition of each matrix. Accordingly, the signal components of the transmission signal $s_l$ can be determined successively one after another if one of the signal components depending only on the bottom right matrix element (for example, $s_{lM}$) is determined. Consequently, the operational workload for signal separation can be reduced, as compared with the fourth embodiment.

In addition, the diagonal elements of the matrix $\Theta_{kl} R_{1kl}$ affect on the transmission signal $s_l$ more greatly than the other matrix elements. Such matrix elements are positive real numbers, and do not contain an imaginary component. Therefore, the dominant portions of the contribution $\Sigma E_k \Theta_{kl} R_{1kl}$ from the L relay nodes are combined in phase, and the signal-to-noise power ratio can be improved at the destination node. Furthermore, noise $n_k$ is not amplified by $A_{kl}$ and $U_{kl}$ because these matrices are unitary matrices. Consequently, accuracy in signal detection at the destination node can be further improved.

Embodiment 7

In Embodiments 4, 5, and 6, a signal $y'_{kl}$ obtained by multiplying the received signal $y_k$ by a unitary matrix $U^H_{kl}$ estimated through singular value decomposition is used. However, the signal processing described in Embodiment 4, 5, and 6 may be applied to a signal $y'_{kl}$ acquired by multiplying the received signal $y_k$ by a weighting matrix $W^b_{kl}$ may be used, as in the conventional techniques ($W^b_{kl} y_k = s_l + W^b_{kl} n_k$).

In this case, the transmission filter 1010-1 may output a signal produced by multiplying the signal $y'_{kl} (=W^b_{kl} y_k)$ by the unitary matrix $A_{kl}$ described in the fourth embodiment.

Alternatively, the transmission filter 1010-1 may output a signal produced by multiplying the signal $y'_{kl} (=W^b_{kl} y_k)$ by the matrix $\Phi_{kl} (=Q_{2kl} \Theta_{kl} Q^H_{1kl})$ explained in the fifth embodiment together with the unitary matrix $A_{kl}$.

In still another alternative, the transmission filter 1010-1 may output a signal produced by multiplying the signal $y'_{kl} (=W^b_{kl} y_k)$ by the matrix $\Phi_{kl}$ (equal to $\Theta_{kl} Q^H_{1kl}$) explained in the sixth embodiment together with the unitary matrix $A_{kl}$ described in the fourth embodiment.

Embodiment 8

In the eighth embodiment, $W^b_{kl}$ is applied to the receiving filter, as in the seventh embodiment. The receiving filter, the intermediate filter and the transmission filter of the relay node perform arithmetic operations to produce signals shown in FIG. 14. The relay node generates a second unitary matrix $A_{kl}$, as in the fourth embodiment, using the method described in the first embodiment. The second unitary matrix $A_{kl}$ is acquired by performing singular value decomposition involving multiple channel matrices, as expressed in Equation (40).

Then, QR decomposition is performed on matrix $(G_{kl} A_{kl})^H$.

$$(G_{kl} A_{kl})^H = Q_{2kl} R_{2kl}$$

where $Q_{2kl}$ is a (N-M(L-1))×M matrix whose column vectors are orthogonal to each other (called a unitary matrix in this application), and R2kl is an M×M matrix and a upper right triangular matrix.

Using this triangular matrix, a diagonal matrix $\Theta_{kl}$ is estimated. The diagonal matrix $\Theta_{kl}$ is defined as $$\Theta_{k,l} = \begin{bmatrix} \frac{(R_{2k,l})_{1,1}}{\|(R_{2k,l})_{1,1}\|} & & & O \\ & \ddots & & \\ & & \frac{(R_{2k,l})_{m,m}}{\|(R_{2k,l})_{m,m}\|} & \\ & & & \ddots \\ O & & & \frac{(R_{2k,l})_{M,M}}{\|(R_{2k,l})_{M,M}\|} \end{bmatrix} \quad (64)$$

Based on the diagonal matrix $\Theta_{kl}$ and the unitary matrix $Q_{2kl}$, an M×M transformation matrix $\Phi_{kl}$ is estimated, as indicated by Equation (65).

$$\Phi_{kl} = Q_{2kl}\Theta_{kl} \quad (65)$$

The relay node further estimates a weighting matrix Wbkl defined by Equation (66).

$$[W^{bT}_{k,1} \ldots W^{bT}_{k,l} \ldots W^{bT}_{k,L}] = (H_k^H \cdot H_k)^{-1} \cdot H_k^H \quad (66)$$

(ML×N MATRIX)

Equation (66) is the same as Equation (31-1) already explained in the fourth embodiment.

Using the unitary matrix, the transformation matrix, and the weighting matrix, a relaying signal $x_k$ is produced using Equation (67), and transmitted to the destination node.

$$x_k = E_k \sum_{l=1}^{L} A_{k,l} \Phi^b_{k,l} W^b_{k,l} \cdot y_k \quad (67)$$

(N × 1 MATRIX)

The signal $r_l$ received at the target destination node (referred to as the l-th destination node for convenience) is expressed as $$r_l = \sum_{k=1}^{K} G_{k,l} x_k \quad (68)$$
$$= \sum_{k=1}^{K} E_k R^H_{2k,l} \Theta_{k,l} s_l + \sum_{k=1}^{K} E_k R^H_{2k,l} \Theta_{k,l} W^b_{k,l} n_k + z_l$$

(M × 1 MATRIX)

where the first term $(R^H_{2kl}\Theta_{kl})$ of the right-hand side is a lower left triangular matrix and its diagonal elements are positive real numbers. Accordingly, when K relay signals from K relay nodes are combined at the destination node, the diagonal components are combined in phase. As a result, the power to noise ratio at the destination node can be improved, and the transmission signal $s_l$ can be detected accurately using a successive interference canceling method.

Embodiment 9

In the ninth embodiment, the relay node 14 detects signals based on the method using a unitary matrix or the zero-forcing (ZF) method, depending on the channel condition. When using a unitary matrix, the unitary matrix is estimated by singular value decomposition explained above. When using zero forcing, a ZF weighting factor is calculated by a Moore-Penrose inverse matrix. A relaying signal $x_k$ is generated according to the channel condition, and transmitted to the destination node. The destination node detects the transmission signal transmitted from the source node in the above-described manner. The quality of the channel condition may be determined by the channel estimator (FIG. 3 or 5) at the relay node. Alternatively, the quality of the channel condition may be determined based on the ratio of the power level of a desired wave to that of an undesired wave (such as SIR or SNR).

For instance, the relay node estimates a channel condition $SNR_H$ between the source node and the relay node and a channel condition $SNR_G$ between the relay node and the destination node.

If $SNR_H \gg SNR_G$, the channel condition between the source node and the relay node is very good. Accordingly, even if zero-forcing is applied between the source node and the relay node, noise amplification is sufficiently small, and it can be reglected. On the other hand, a method using a unitary matrix is applied between the relay node and the destination node because influence of noise amplification increases between the relay node and the destination node (similar to FIG. 14).

On the contrary, if $SNR_H \ll SNR_G$, then the opposite procedure (shown in FIG. 13) is performed.

Figure 14:
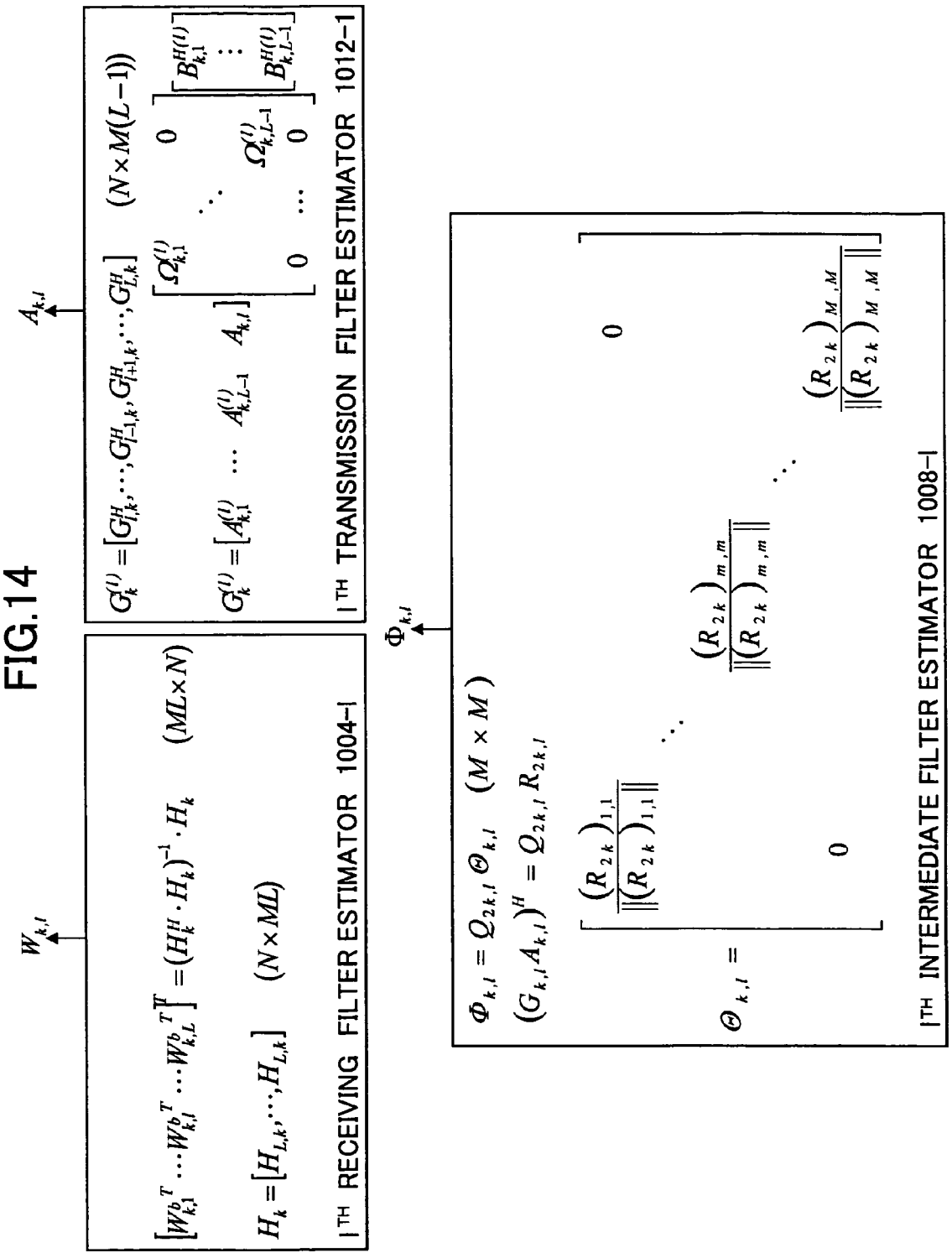
FIG. 14 is a diagram illustrating yet another example of the arithmetic operation carried out at the relay node.

The intermediate filter may also be appropriately selected from those shown in FIG. 12 through FIG. 14. By adaptively changing the relaying scheme at the relay node 14 depending on the quality of the channel condition, the receiving quality characteristic at the destination node can be improved.

This patent application is based on and claims the benefit of the earlier filing dates of Japanese Patent Applications No. 2004-252879 filed Aug. 31, 2004, No. 2004-306172 filed Oct. 20, 2004, and No. 2005-248823, filed Aug. 30, 2005, the entire contents of which are hereby incorporated by reference.

What is claimed is:

1. A wireless communication system for delivering a transmission signal from a desired source node among multiple source nodes via a relay node toward a target destination node, wherein the relay node comprises:
a first unitary matrix estimation unit configured to estimate a first unitary matrix by performing singular value decomposition using one or more channel matrices generated based only on signals propagated between the relay node and said multiple source nodes other than the desired source node;

a second unitary matrix estimation unit configured to estimate a second unitary matrix by performing singular value decomposition using one of more channel matrices generated based only on signals propagated between the relay node and multiple destination nodes other than the target destination node; and a transmission unit configured to transmit a relaying signal, generated by multiplying a received signal by the first and second unitary matrices, to the target destination node;

wherein the destination node detects a transmission signal, transmitted from the desired source node, from the received relaying signal.

2. A communication node for relaying a transmission signal transmitted from a desired source node to a target destination node among multiple source nodes and multiple destination nodes, comprising:
a first unitary matrix estimation unit configured to estimate a first unitary matrix by performing singular value decomposition using one or more channel matrices generated based only on signals propagated between the relay node and said multiple source nodes other than the desired source node;
a second unitary matrix estimation unit configured to estimate a second unitary matrix by performing singular value decomposition using one of more channel matrices generated based only on signals propagated between the relay node and said multiple destination nodes other than the target destination node; and
a transmission unit configured to transmit a relaying signal, generated by multiplying a received signal by the first and second unitary matrices, to the target destination node.

3. The communication node of claim 2, further comprising:
a transformation matrix estimation unit configured to estimate a transformation matrix consisting of a product of a matrix, in which a matrix element at an i-th line and a j-th column is zero if i+j does not satisfy a prescribed value, and one or more unitary matrices;
wherein the transmission unit transmits the relaying signal generated by multiplying the received signal by the first unitary matrix, the transformation matrix, and the second unitary matrix, to the destination node.

4. The communication node of claim 2, further comprising:
a transformation matrix estimation unit consisting of a product of a diagonal matrix and a unitary matrix derived from a channel matrix generated based on signals propagated between the source node and the relay node or between the relay node and the destination node;
wherein the transmission unit transmits the relaying signal, generated by multiplying the received signal by the first unitary matrix, the transformation matrix, and the second unitary matrix, to the destination node.

5. A communication method for relaying a transmission signal transmitted from a desired source node among multiple source nodes to a destination node via a relay node, comprising:
estimating, at the relay node, a first unitary matrix by performing singular value decomposition using one or more channel matrices generated based only on signals propagated between the relay node and said multiple source nodes other than the desired source node, and a second unitary matrix by performing singular value decomposition using one of more channel matrices generated based only on signals propagated between the relay node and multiple destination nodes other than said destination node;
transmitting a relaying signal, generated at the relay node by multiplying a received signal by the first and second unitary matrices, to the destination node; and
detecting, at the destination node, a transmission signal, transmitted from the desired source node, from the received relaying signal.

6. A wireless communication system for delivering a transmission signal from a desired source node among multiple source nodes via a relay node toward a target destination node, comprising:
a matrix estimation unit configured to estimate a Moore-Penrose inverse matrix derived from a plurality of channel matrices generated based on signals propagated between the relay node and multiple nodes;
a relaying signal generating unit configured to generate a relaying signal by multiplying a received signal by a weighting matrix defining the Moore-Penrose inverse matrix and by a unitary matrix acquired by performing singular value decomposition using one or more channel matrices generated based only on signals propagated between the relay node and said multiple nodes other than a prescribed node; and
a transmission unit configured to transmit the relaying signal to the destination node;
wherein the destination node detects the transmission signal from the received relaying signal.

7. A communication node for relaying a transmission signal transmitted from a desired source node among multiple source nodes to a destination node, comprising:
a matrix estimation unit configured to estimates a Moore-Penrose inverse matrix derived from a plurality of channel matrices generated based on signals propagated between the relay node and multiple nodes;
a relaying signal generating unit configured to generate a relaying signal by multiplying a received signal by a weighting matrix defining the Moore-Penrose inverse matrix and by a first unitary matrix acquired by performing singular value decomposition using one or more channel matrices generated based only on signals propagated between the relay node and said multiple nodes other than a prescribed node; and
a transmission unit configured to transmit the relaying signal to the destination node.

8. The communication node of claim 7, further comprising:
a transformation matrix estimation unit configured to estimate a transformation matrix consisting of a product of a matrix, in which a matrix element at an i-th line and a j-th column is zero if i+j does not satisfy a prescribed value, and one or more unitary matrices;
wherein the transmission unit transmits the relaying signal generated by multiplying the received signal by the transformation matrix and the first unitary matrix, to the destination node.

9. The communication node of claim 7, further comprising:
a transformation matrix estimation unit consisting of a product of a diagonal matrix and a unitary matrix derived from a channel matrix generated based on signals propagated between the source node and the relay node or between the relay node and the destination node;
wherein the transmission unit transmits the relaying signal, generated by multiplying the received signal by the transformation matrix and the first unitary matrix, to the destination node.

10. A communication method for relaying a transmission signal transmitted from a desired source node among multiple source nodes to a destination node via a relay node, comprising the steps of:
estimating, at the relay node, a Moore-Penrose inverse matrix derived from a plurality of channel matrices generated based on signals propagated between the relay node and multiple nodes;
generating a relaying signal by multiplying a received signal by a weighting matrix defining the Moore-Penrose inverse matrix and by a unitary matrix acquired by performing singular value decomposition using one or more channel matrices generated based only on signals propagated between the relay node and said multiple nodes other than a prescribed node;
transmitting the relaying signal to the destination node; and detecting, at the destination node, the transmission signal from the received relaying signal.

11. A communication node for relaying a transmission signal transmitted from a desired source node among multiple source nodes to a destination node, comprising:
- a matrix estimation unit configured to estimate a Moore-Penrose inverse matrix derived from a plurality of channel matrices generated based on signals propagated between the relay node and multiple nodes;
- a first unitary matrix estimation unit configured to estimate a first unitary matrix by performing singular value decomposition using one or more channel matrices generated based only on signals propagated between the relay node and said multiple source nodes other than the desired source node;
- a second unitary matrix estimation unit configured to estimate a second unitary matrix by performing singular value decomposition using one or more channel matrices generated based only on signals propagated between the relay node and multiple destination nodes other than said destination node;
- a relaying signal generating unit configured to generate a relaying signal by multiplying a received signal by two of a weighting matrix defining the Moore-Penrose inverse matrix, the first unitary matrix, and the second unitary matrix; and
- a transmission unit configured to transmit the relaying signal to the destination node.

12. The communication node of claim 11, wherein said two of the matrices are selected based on the quality of the channel condition.

13. A communication method for relaying a transmission signal transmitted from a desired source node among multiple source nodes to a destination node via a relay node, comprising:
- estimating, at the relay node, a Moore-Penrose inverse matrix derived from a plurality of channel matrices generated based on signals propagated between the relay node and multiple nodes;
- estimating, at the relay node, a first unitary matrix by performing singular value decomposition using one or more channel matrices generated based only on signals propagated between the relay node and said multiple source nodes other than the desired source node, and a second unitary matrix by performing singular value decomposition using one or more channel matrices generated based only on signals propagated between the relay node and multiple destination nodes other than said destination node;
- generating a relaying signal by multiplying a received signal by two of a weighting matrix defining the Moore-Penrose inverse matrix, the first unitary matrix, and the second unitary matrix; and
- transmitting the relaying signal to the destination node.

* * * * *